US011581978B2

(12) United States Patent
Hosseini et al.

(10) Patent No.: US 11,581,978 B2
(45) Date of Patent: Feb. 14, 2023

(54) UPLINK REPETITION CONFIGURATION

(71) Applicant: QUALCOMM Incorporated, San Diego, CA (US)

(72) Inventors: Seyedkianoush Hosseini, San Diego, CA (US); Alexandros Manolakos, Escondido, CA (US); Seyed Ali Akbar Fakoorian, San Diego, CA (US); Mostafa Khoshnevisan, San Diego, CA (US); Wei Yang, San Diego, CA (US); Hung Dinh Ly, San Diego, CA (US); Wanshi Chen, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 78 days.

(21) Appl. No.: 16/984,420

(22) Filed: Aug. 4, 2020

(65) Prior Publication Data

US 2021/0044385 A1 Feb. 11, 2021

(30) Foreign Application Priority Data

Aug. 6, 2019 (GR) ............................... 20190100337

(51) Int. Cl.
*H04L 1/08* (2006.01)
*H04L 5/00* (2006.01)
(Continued)

(52) U.S. Cl.
CPC .............. *H04L 1/08* (2013.01); *H04L 5/0023* (2013.01); *H04L 5/0044* (2013.01); *H04W 72/1268* (2013.01); *H04W 72/1289* (2013.01)

(58) Field of Classification Search
USPC .......................................................... 370/330
See application file for complete search history.

(56) References Cited

U.S. PATENT DOCUMENTS 10,863,494 B2 * 12/2020 Zhang ..................... H04L 5/005
2019/0281588 A1 * 9/2019 Zhang ................... H04W 52/08
(Continued)

FOREIGN PATENT DOCUMENTS

WO WO-2020155179 A1 8/2020

OTHER PUBLICATIONS

NTT Docomo, Inc. 3GPP TSG RAN WG1 #97 R1-1906225 Reno, USA, May 13-17, 2019 (Year: 2019).*
(Continued)

*Primary Examiner* — Jeffrey M Rutkowski
*Assistant Examiner* — Luna Weissberger
(74) *Attorney, Agent, or Firm* — Kevin T. Cheatham

(57) ABSTRACT

Methods, systems, and devices for wireless communications are described. For example, a user equipment (UE) may be configured to receive a downlink control message (e.g., an uplink grant) that schedules resources for transmitting repetitions of an uplink channel transmission, where each of the repetitions of the uplink channel transmission may correspond to a single transport block. The UE may determine a plurality of sounding reference signal (SRS) resources based on the downlink control message, and transmit different instances of the uplink channel transmission repetitions according to different SRS resources. The described examples for uplink repetitions may support various techniques for uplink coverage enhancement and diversity gains.

28 Claims, 16 Drawing Sheets

(51) Int. Cl.
*H04W 72/12* (2009.01)
*H04W 72/1268* (2023.01)

(56) References Cited

U.S. PATENT DOCUMENTS

2019/0313436 A1* 10/2019 Lee .................. H04W 72/1289
2021/0345305 A1* 11/2021 Takeda ................ H04W 72/042

OTHER PUBLICATIONS

International Search Report and Written Opinion—PCT/US2020/045003—ISA/EPO—dated Nov. 9, 2020 (194028WO).
Lenovo., et al., "Discussion on UL Multi-Panel Transmission", 3GPP Draft, R1-1906276, 3GPP TSG RAN WG1 Meeting #97, Discussion On UL Transmission with Multi-TRP V1, 3rd Generation Partnership Project (3GPP), Mobile Competence Centre, 650, Route Des Lucioles, F-06921 Sophia-Antipolis Cedex, vol. RAN WG1, No. Reno, USA, May 13, 2019-May 17, 2019, May 13, 2019 (May 13, 2019), XP051727728, 8 Pages, Retrieved from the Internet:URL:http://www.3gpp.org/ftp/Meetings%5F3GPP%5FSYNC/RAN1/Docs/R1%2D1906276%2Ezip [retrieved on May 13, 2019] Section 2.1.
NTT Docomo, et al., "Layer 1 Enhancements for NR URLLC", 3GPP Draft, 3GPP TSG RAN WG1 Meeting #94bis, R1-1811378, EURLLC L1 Enhancement, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051518782, 18 Pages, Retrieved from the Internet, URL: http://www.3gpp.org/ftp/tsg%5Fran/WG1%5FRL1/TSGR1%5F94b/Docs/R1%2D1811378%2Ezip [retrieved on Sep. 29, 2018], pp. 12-13, Table 1, Figure 8, Section 4.

* cited by examiner

UPLINK REPETITION CONFIGURATION

CROSS REFERENCE

The present Application for Patent claims the benefit of Greece Provisional Patent Application No. 20190100337 by HOSSEINI et al., entitled "UPLINK REPETITION CONFIGURATION," filed Aug. 6, 2019, assigned to the assignee hereof, and expressly incorporated by reference herein.

FIELD OF TECHNOLOGY

The following relates generally to wireless communications and more specifically to uplink repetition configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some examples, a wireless communications system may employ various techniques for uplink coverage enhancement between a UE and a base station. However, configuring such techniques may be associated with various challenges or inefficiencies.

SUMMARY

The described techniques relate to improved methods, systems, devices, and apparatuses that support uplink repetition configuration. Generally, the described techniques provide for configuring a user equipment (UE) to repeat uplink transmissions using different communication resources, such as different sounding reference signal (SRS) resources. For example, a UE may be configured to receive (e.g., from a base station) a downlink control message, such as downlink control information (DCI) via a physical downlink control channel (PDCCH), that schedules resources for transmitting repetitions of an uplink channel transmission (e.g., repetitions of a physical uplink shared channel (PUSCH)). In some examples, each of the repetitions of the uplink channel transmission may correspond to a single transport block (TB), and the repetitions may each be configured to carry the information of the TB.

To support transmission of the repetitions, the UE may identify an SRS resource indicator (SRI) or SRI field of the downlink control message, and determine a plurality of SRS resources based on the SRI or SRI field. According to various techniques, the UE may transmit the repetitions of the uplink channel transmission (e.g., repetitions of the TB), where the transmitting includes transmitting a first of the repetitions according to a first sounding reference signal resource of the plurality of sounding reference signal resources, and transmitting a second of the repetitions according to a second sounding reference signal resource of the plurality of sounding reference signal resources. In other words, the UE may transmit different instances of an uplink channel transmission repetition according to different SRS resources, which may be based on (e.g., configured by) an SRI or SRI field received from a scheduling entity such as a base station.

By applying the described techniques for uplink repetition, a wireless communications system may support more reliable communications, more efficient communications, or both. For example, where different SRS resources correspond to different resources in the spatial domain (e.g., different spatial layers, different beams, different codebooks, different antennas or sets of antennas, different antenna ports), the described techniques for uplink repetitions may support enhanced uplink coverage and diversity gains. Moreover, by applying the described techniques for uplink repetition, such gains may be realized with relatively limited control signaling or other overhead. For example, the described techniques may utilize various configurations (e.g., preconfiguration, lookup tables or other lookup resources) between a base station and a UE, such that downlink control signaling corresponding to a particular uplink transmission (e.g., an instance of DCI, an uplink grant) can indicate resources for uplink transmission repetition more efficiently than when such configuration between a base station and a UE are not applied.

A method of wireless communications at a UE is described. The method may include receiving a downlink control message (e.g., downlink control information, a PDCCH, an uplink grant) that schedules resources for transmitting repetitions of an uplink channel transmission (e.g., PUSCH repetitions), identifying from the downlink control message a sounding reference signal resource indicator (e.g., an SRI field indicating a set of one or more SRIs), determining a set of sounding reference signal resources based on the sounding reference signal resource indicator, and transmitting the repetitions of the uplink channel transmission, where the transmitting includes transmitting a first of the repetitions according to a first sounding reference signal resource of the set of sounding reference signal resources and transmitting a second of the repetitions according to a second sounding reference signal resource of the set of sounding reference signal resources.

An apparatus for wireless communications at a UE is described. The apparatus may include a processor, memory coupled with the processor, and instructions stored in the memory. The instructions may be executable by the processor to cause the apparatus to receive a downlink control message (e.g., downlink control information, a PDCCH, an uplink grant) that schedules resources for transmitting repetitions of an uplink channel transmission (e.g., PUSCH repetitions), identify from the downlink control message a sounding reference signal resource indicator (e.g., an SRI field indicating a set of one or more SRIs), determine a set of sounding reference signal resources based on the sounding reference signal resource indicator, and transmit the repetitions of the uplink channel transmission, where the transmitting includes transmitting a first of the repetitions according to a first sounding reference signal resource of the set of sounding reference signal resources and transmitting a second of the repetitions according to a second sounding reference signal resource of the set of sounding reference signal resources.

Another apparatus for wireless communications at a UE is described. The apparatus may include means for receiving a downlink control message (e.g., downlink control information, a PDCCH, an uplink grant) that schedules resources for transmitting repetitions of an uplink channel transmission (e.g., PUSCH repetitions), identifying from the downlink control message a sounding reference signal resource indicator (e.g., an SRI field indicating a set of one or more SRIs), determining a set of sounding reference signal resources based on the sounding reference signal resource indicator, and transmitting the repetitions of the uplink channel transmission, where the transmitting includes transmitting a first of the repetitions according to a first sounding reference signal resource of the set of sounding reference signal resources and transmitting a second of the repetitions according to a second sounding reference signal resource of the set of sounding reference signal resources.

A non-transitory computer-readable medium storing code for wireless communications at a UE is described. The code may include instructions executable by a processor to receive a downlink control message (e.g., downlink control information, a PDCCH, an uplink grant) that schedules resources for transmitting repetitions of an uplink channel transmission (e.g., PUSCH repetitions), identify from the downlink control message a sounding reference signal resource indicator (e.g., an SRI field indicating a set of one or more SRIs), determine a set of sounding reference signal resources based on the sounding reference signal resource indicator, and transmit the repetitions of the uplink channel transmission, where the transmitting includes transmitting a first of the repetitions according to a first sounding reference signal resource of the set of sounding reference signal resources and transmitting a second of the repetitions according to a second sounding reference signal resource of the set of sounding reference signal resources.

In some examples of the method, apparatuses, and non-transitory computer-readable medium described herein, each of the set of sounding reference signal resources corresponds to a respective spatial resource (e.g., a respective resource in the spatial domain associated with the respective SRS resource, a respective spatial layer associated with the respective SRS resource, a respective beam associated with the respective SRS resource, a respective codebook associated with the respective SRS resource, a respective antenna or set of antennas associated with the respective SRS resource, a respective antenna port associated with the respective SRS resource).

Some examples of the method, apparatuses, and non-transitory computer-readable medium described herein may further include operations, features, means, or instructions for receiving a configuration (e.g., an RRC configuration, a DCI indication, separately from the downlink control message) configuring the UE to interpret sounding reference signal resource indicators for uplink transmission repetitions (e.g., configuring the UE to interpret an SRI field as indicating SRS resources to be mapped to different PUSCH repetitions in the time domain, rather than interpreting an SRI field as indicating SRS resources that may be to be combined for a single MIMO transmission in the time domain).

In some examples of the method, apparatuses, and non-transitory computer-readable medium described herein, determining the set of sounding reference signal resources may include operations, features, means, or instructions for identifying a non-codebook sounding reference signal resource indicator table based on a maximum quantity of spatial layers supported by the UE (e.g., $L_{max}$), and identifying a field of the non-codebook sounding reference signal resource indicator table based on a quantity of configured sounding reference signal resources (e.g., $N_{SRS}$) and the sounding reference signal resource indicator, where the field indicates the set of sounding reference signal resources.

Some examples of the method, apparatuses, and non-transitory computer-readable medium described herein may further include operations, features, means, or instructions for receiving an indication of a repetition factor (e.g., K), the repetition factor corresponding to a quantity of repetitions of the uplink channel transmission.

Some examples of the method, apparatuses, and non-transitory computer-readable medium described herein may further include operations, features, means, or instructions for interpreting the repetition factor to indicate a respective quantity of repetitions of the uplink channel transmission for different ones of the set of sounding reference signal resources.

Some examples of the method, apparatuses, and non-transitory computer-readable medium described herein may further include operations, features, means, or instructions for interpreting the repetition factor to indicate a total quantity of repetitions of the uplink channel transmission, identifying that the repetition factor exceeds the quantity of sounding reference signal resources in the determined set of sounding reference signal resources, and transmitting at least two of the repetitions of the uplink channel transmission with a same one of the set of sounding reference signal resources.

In some examples of the method, apparatuses, and non-transitory computer-readable medium described herein, the indication of the repetition factor may be received in the downlink control message (e.g., DCI, a PDCCH transmission) or radio resource control signaling (e.g., an RRC configuration).

Some examples of the method, apparatuses, and non-transitory computer-readable medium described herein may further include operations, features, means, or instructions for mapping (e.g., according to a cyclic mapping approach) each of the set of sounding reference signal resources to a respective one of the repetitions of the uplink channel transmission in a first sub-sequence of the repetitions of the uplink channel transmission, and mapping at least one of the set of sounding reference signal resources to a respective one of the repetitions of the uplink channel transmission in a second sub-sequence of the repetitions of the uplink channel transmission.

Some examples of the method, apparatuses, and non-transitory computer-readable medium described herein may further include operations, features, means, or instructions for mapping (e.g., according to a back-to-back approach) a first of the set of sounding reference signal resources to at least two of the repetitions of the uplink channel transmission in a first sub-sequence of the repetitions of the uplink channel transmission, and mapping a second of the set of sounding reference signal resources to at least two of the repetitions of the uplink channel transmission in a second sub-sequence of the repetitions of the uplink channel transmission.

Some examples of the method, apparatuses, and non-transitory computer-readable medium described herein may further include operations, features, means, or instructions for receiving control signaling (e.g., DCI, a PDCCH transmission) indicating a configuration for mapping sounding reference signal resources to the repetitions of the uplink channel transmission.

Some examples of the method, apparatuses, and non-transitory computer-readable medium described herein may further include operations, features, means, or instructions for identifying that one of the repetitions of the uplink channel transmission overlaps a transmission boundary (e.g., a slot boundary) in the time domain, mapping a portion of the one of the repetitions of the uplink channel transmission that precedes the slot boundary to a first of the set of sounding reference signal resources, and mapping a portion of the one of the repetitions of the uplink channel transmission that follows the slot boundary to a second of the set of sounding reference signal resources.

In some examples of the method, apparatuses, and non-transitory computer-readable medium described herein, the first of the set of sounding reference signal resources may be different from the second of the set of sounding reference signal resources.

In some examples of the method, apparatuses, and non-transitory computer-readable medium described herein, the first of the set of sounding reference signal resources may be the same as the second of the set of sounding reference signal resources.

Some examples of the method, apparatuses, and non-transitory computer-readable medium described herein may further include operations, features, means, or instructions for identifying from the downlink control message a second sounding reference signal resource indicator (e.g., a second SRI), determining a second set of sounding reference signal resources based on the sounding reference signal resource indicator, mapping the first of the repetitions to at least two of (e.g., each of) the set of sounding reference signal resources (e.g., for a transmission of the first of the repetitions according to multiple beams, multiple spatial layers, or an effective beam or layer resulting from the combination of the at least two of the set of SRS resources), mapping the second of the repetitions to at least two of (e.g., each of) the set of sounding reference signal resources, and mapping a third of the repetitions to at least two of (e.g., each of) the second set of sounding reference signal resources.

In some examples of the method, apparatuses, and non-transitory computer-readable medium described herein, transmitting the first of the repetitions may include operations, features, means, or instructions for transmitting over a first set of spatial layers and transmitting the third of the repetitions.

Some examples of the method, apparatuses, and non-transitory computer-readable medium described herein may further include operations, features, means, or instructions for identifying from the downlink control message a redundancy version indicator, and mapping the repetitions of the uplink channel transmission to the set of sounding reference signal resources based on jointly decoding the sounding reference signal resource indicator and the redundancy version indicator.

Some examples of the method, apparatuses, and non-transitory computer-readable medium described herein may further include operations, features, means, or instructions for receiving a configuration (e.g., an RRC configuration) for mapping single-bit sounding reference signal resource indicators to sounding reference signal resources indicated by two-bit sounding reference signal resource indicators, and determining the set of sounding reference signal resources may be based on the sounding reference signal resource indicator and the received configuration.

In some examples of the method, apparatuses, and non-transitory computer-readable medium described herein, the configuration may be based on the UE being configured for codebook-based uplink communication.

In some examples of the method, apparatuses, and non-transitory computer-readable medium described herein, the UE may be configured for codebook-based uplink communication and the sounding reference signal resource indicator includes a two bit indication.

Some examples of the method, apparatuses, and non-transitory computer-readable medium described herein may further include operations, features, means, or instructions for mapping a first transmit precoding matrix (e.g., TPMI) to a first of the set of sounding reference signal resources, and mapping a second transmit precoding matrix to a second of the set of sounding reference signal resources.

Some examples of the method, apparatuses, and non-transitory computer-readable medium described herein may further include operations, features, means, or instructions for mapping each of the repetitions of the uplink channel transmission to different resources in the time domain (e.g., time domain resources of an uplink grant or otherwise configured resources in the time domain, where each of the repetitions of the uplink channel transmission may be non-overlapping in the time domain).

Some examples of the method, apparatuses, and non-transitory computer-readable medium described herein may further include operations, features, means, or instructions for mapping each of the repetitions of the uplink channel transmission to the same resources in the frequency domain (e.g., frequency domain resources of an uplink grant or otherwise configured resources in the frequency domain, where each of the repetitions of the uplink channel transmission use the same frequency resources, the same carrier, the same subcarrier, the same bandwidth part).

In some examples of the method, apparatuses, and non-transitory computer-readable medium described herein, the uplink channel transmission includes a single transport block (e.g., where the single transport block may be repeated in each of the uplink channel transmission repetitions).

In some examples of the method, apparatuses, and non-transitory computer-readable medium described herein, the downlink control message includes downlink control information.

In some examples of the method, apparatuses, and non-transitory computer-readable medium described herein, the spatial resource corresponds to a beam, a precoder, a panel, or a combination thereof.

Some examples of the method, apparatuses, and non-transitory computer-readable medium described herein may further include operations, features, means, or instructions for determining the set of sounding reference signal resources may be based on the UE being configured (e.g., by a receiving base station) for non-codebook-based uplink communication.

Some examples of the method, apparatuses, and non-transitory computer-readable medium described herein may further include operations, features, means, or instructions for determining the set of sounding reference signal resources may be based on the UE being configured for codebook-based uplink communication.

In some examples of the method, apparatuses, and non-transitory computer-readable medium described herein, the transmission of each of the repetitions of the uplink channel transmission corresponds to a single spatial layer transmission.

A method of wireless communications at a base station is described. The method may include transmitting, to a UE, a downlink control message (e.g., downlink control information, a PDCCH) that schedules resources for transmitting repetitions of an uplink channel transmission, where the downlink control message includes a sounding reference signal resource indicator (e.g., an SRI) and receiving the repetitions of the uplink channel transmission from the UE according to a set of sounding reference signal resources indicated by the sounding reference signal resource indicator, where the receiving includes receiving a first of the repetitions according to a first of the set of sounding reference signal resources and receiving a second of the repetitions according to a second of the set of sounding reference signal resources.

An apparatus for wireless communications at a base station is described. The apparatus may include a processor, memory coupled with the processor, and instructions stored in the memory. The instructions may be executable by the processor to cause the apparatus to transmit, to a UE, a downlink control message (e.g., downlink control information, a PDCCH) that schedules resources for transmitting repetitions of an uplink channel transmission, where the downlink control message includes a sounding reference signal resource indicator (e.g., an SRI) and receive the repetitions of the uplink channel transmission from the UE according to a set of sounding reference signal resources indicated by the sounding reference signal resource indicator, where the receiving includes receiving a first of the repetitions according to a first of the set of sounding reference signal resources and receiving a second of the repetitions according to a second of the set of sounding reference signal resources.

Another apparatus for wireless communications at a base station is described. The apparatus may include means for transmitting, to a UE, a downlink control message (e.g., downlink control information, a PDCCH) that schedules resources for transmitting repetitions of an uplink channel transmission, where the downlink control message includes a sounding reference signal resource indicator (e.g., an SRI) and receiving the repetitions of the uplink channel transmission from the UE according to a set of sounding reference signal resources indicated by the sounding reference signal resource indicator, where the receiving includes receiving a first of the repetitions according to a first of the set of sounding reference signal resources and receiving a second of the repetitions according to a second of the set of sounding reference signal resources.

A non-transitory computer-readable medium storing code for wireless communications at a base station is described. The code may include instructions executable by a processor to transmit, to a UE, a downlink control message (e.g., downlink control information, a PDCCH) that schedules resources for transmitting repetitions of an uplink channel transmission, where the downlink control message includes a sounding reference signal resource indicator (e.g., an SRI) and receive the repetitions of the uplink channel transmission from the UE according to a set of sounding reference signal resources indicated by the sounding reference signal resource indicator, where the receiving includes receiving a first of the repetitions according to a first of the set of sounding reference signal resources and receiving a second of the repetitions according to a second of the set of sounding reference signal resources.

In some examples of the method, apparatuses, and non-transitory computer-readable medium described herein, each of the set of sounding reference signal resources corresponds to a respective spatial resource (e.g., a respective resource in the spatial domain associated with the respective SRS resource, a respective spatial layer associated with the respective SRS resource, a respective beam associated with the respective SRS resource, a respective codebook associated with the respective SRS resource, a respective antenna or set of antennas associated with the respective SRS resource, a respective antenna port associated with the respective SRS resource).

Some examples of the method, apparatuses, and non-transitory computer-readable medium described herein may further include operations, features, means, or instructions for transmitting a configuration (e.g., an RRC configuration, a DCI indication, separately from the downlink control message) configuring the UE to interpret sounding reference signal resource indicators for uplink transmission repetitions (e.g., configuring the UE to interpret an SRI field as indicating SRS resources to be mapped to different PUSCH repetitions in the time domain, rather than interpreting an SRI field as indicating SRS resources that may be to be combined for a single MIMO transmission in the time domain).

Some examples of the method, apparatuses, and non-transitory computer-readable medium described herein may further include operations, features, means, or instructions for identifying a non-codebook sounding reference signal resource indicator table based on a maximum quantity of spatial layers supported by the UE (e.g., $L_{max}$), selecting a field of the non-codebook sounding reference signal resource indicator table based on a quantity of configured sounding reference signal resources (e.g., $N_{SRS}$) and a set of sounding reference signal resources, and determining the sounding reference signal resource indicator based on the selected field.

Some examples of the method, apparatuses, and non-transitory computer-readable medium described herein may further include operations, features, means, or instructions for transmitting an indication of a repetition factor (e.g., K), the repetition factor corresponding to a quantity of repetitions of the uplink channel transmission.

Some examples of the method, apparatuses, and non-transitory computer-readable medium described herein may further include operations, features, means, or instructions for configuring the UE to interpret the repetition factor as indicating a respective quantity of repetitions of the uplink channel transmission for different ones of a set of sounding reference signal resources.

Some examples of the method, apparatuses, and non-transitory computer-readable medium described herein may further include operations, features, means, or instructions for configuring the UE to interpret the repetition factor to indicate a total quantity of repetitions of the uplink channel transmission.

In some examples of the method, apparatuses, and non-transitory computer-readable medium described herein, the indication of the repetition factor may be transmitted in the downlink control message (e.g., DCI, a PDCCH transmission) or radio resource control signaling (e.g., an RRC configuration).

Some examples of the method, apparatuses, and non-transitory computer-readable medium described herein may further include operations, features, means, or instructions for receiving (e.g., according to a cyclic mapping) a respective repetition of the uplink channel transmission in a first sub-sequence of the repetitions of the uplink channel transmission according to each of the set of sounding reference signal resources, and receiving a respective repetition of the uplink channel transmission in a second sub-sequence of the repetitions of the uplink channel transmission according to at least one of the set of sounding reference signal resources.

Some examples of the method, apparatuses, and non-transitory computer-readable medium described herein may further include operations, features, means, or instructions for receiving (e.g., according to a back-to-back mapping) at least two repetitions of the uplink channel transmission in a first sub-sequence of the repetitions of the uplink channel transmission according to a first of the set of sounding reference signal resources, and receiving at least two repetitions of the uplink channel transmission in a second sub-sequence of the repetitions of the uplink channel transmission according to a second of the set of sounding reference signal resources.

Some examples of the method, apparatuses, and non-transitory computer-readable medium described herein may further include operations, features, means, or instructions for transmitting control signaling (e.g., DCI, a PDCCH transmission) indicating a configuration for mapping sounding reference signal resources to the repetitions of the uplink channel transmission.

Some examples of the method, apparatuses, and non-transitory computer-readable medium described herein may further include operations, features, means, or instructions for identifying that one of the repetitions of the uplink channel transmission overlaps a transmission boundary (e.g., a slot boundary) in the time domain, receiving a portion of the one of the repetitions of the uplink channel transmission that precedes the slot boundary over a first of the set of sounding reference signal resources, and receiving a portion of the one of the repetitions of the uplink channel transmission that follows the slot boundary over a second of the set of sounding reference signal resources.

In some examples of the method, apparatuses, and non-transitory computer-readable medium described herein, the first of the set of sounding reference signal resources may be different from the second of the set of sounding reference signal resources.

In some examples of the method, apparatuses, and non-transitory computer-readable medium described herein, the first of the set of sounding reference signal resources may be the same as the second of the set of sounding reference signal resources.

In some examples of the method, apparatuses, and non-transitory computer-readable medium described herein, the downlink control message may include operations, features, means, or instructions for receiving the first of the repetitions over at least two of (e.g., each of) the set of sounding reference signal resources (e.g., for reception of the first of the repetitions according to multiple transmit beams, multiple spatial layers, or an effective transmit beam or layer resulting from the combination of the at least two of the set of SRS resources), receiving the second of the repetitions over at least two of (e.g., each of) the set of sounding reference signal resources, and receiving a third of the repetitions over at least two of (e.g., each of) the second set of sounding reference signal resources.

In some examples of the method, apparatuses, and non-transitory computer-readable medium described herein, receiving the first of the repetitions may include operations, features, means, or instructions for receiving over a first set of spatial layers and receiving the third of the repetitions.

In some examples of the method, apparatuses, and non-transitory computer-readable medium described herein, the downlink control message includes a redundancy version indicator, and receiving the repetitions of the uplink channel transmission over the set of sounding reference signal resources may be based on jointly encoding the sounding reference signal resource indicator and the redundancy version indicator.

Some examples of the method, apparatuses, and non-transitory computer-readable medium described herein may further include operations, features, means, or instructions for transmitting a configuration (e.g., an RRC configuration) for mapping single-bit sounding reference signal resource indicators to sounding reference signal resources indicated by two-bit sounding reference signal resource indicators, and the set of sounding reference signal resources may be indicated based on the sounding reference signal resource indicator and the transmitted configuration.

In some examples of the method, apparatuses, and non-transitory computer-readable medium described herein, the configuration may be based on configuring the UE for codebook-based uplink communication.

In some examples of the method, apparatuses, and non-transitory computer-readable medium described herein, the UE may be configured for codebook-based uplink communication and the sounding reference signal resource indicator includes a two bit indication.

Some examples of the method, apparatuses, and non-transitory computer-readable medium described herein may further include operations, features, means, or instructions for mapping a first transmit precoding matrix (e.g., TPMI) to a first of the set of sounding reference signal resources, and mapping a second transmit precoding matrix to a second of the set of sounding reference signal resources.

In some examples of the method, apparatuses, and non-transitory computer-readable medium described herein, the receiving may include operations, features, means, or instructions for receiving each of the repetitions of the uplink channel transmission over different resources in the time domain (e.g., where, as scheduled by the base station or otherwise configured, each of the repetitions of the uplink channel transmission may be configured to be non-overlapping in the time domain).

In some examples of the method, apparatuses, and non-transitory computer-readable medium described herein, the receiving may include operations, features, means, or instructions for receiving each of the repetitions of the uplink channel transmission over the same resources in the frequency domain (e.g., where, as scheduled by the base station, each of the repetitions of the uplink channel transmission may be configured to use the same frequency resources, the same carrier, the same subcarrier, the same bandwidth part).

In some examples of the method, apparatuses, and non-transitory computer-readable medium described herein, the uplink channel transmission includes a single transport block (e.g., where the single transport block may be repeated in each of the uplink channel transmission repetitions).

In some examples of the method, apparatuses, and non-transitory computer-readable medium described herein, the downlink control message includes downlink control information.

In some examples of the method, apparatuses, and non-transitory computer-readable medium described herein, the spatial resource corresponds to a beam, a precoder, a panel, or a combination thereof.

In some examples of the method, apparatuses, and non-transitory computer-readable medium described herein, the set of sounding reference signal resources may be indicated based on configuring the UE for non-codebook-based uplink communication.

In some examples of the method, apparatuses, and non-transitory computer-readable medium described herein, the set of sounding reference signal resources may be indicated based on configuring the UE for codebook-based uplink communication.

In some examples of the method, apparatuses, and non-transitory computer-readable medium described herein, the reception of each of the repetitions of the uplink channel transmission corresponds to a single spatial layer reception.

DETAILED DESCRIPTION

Figure 1:
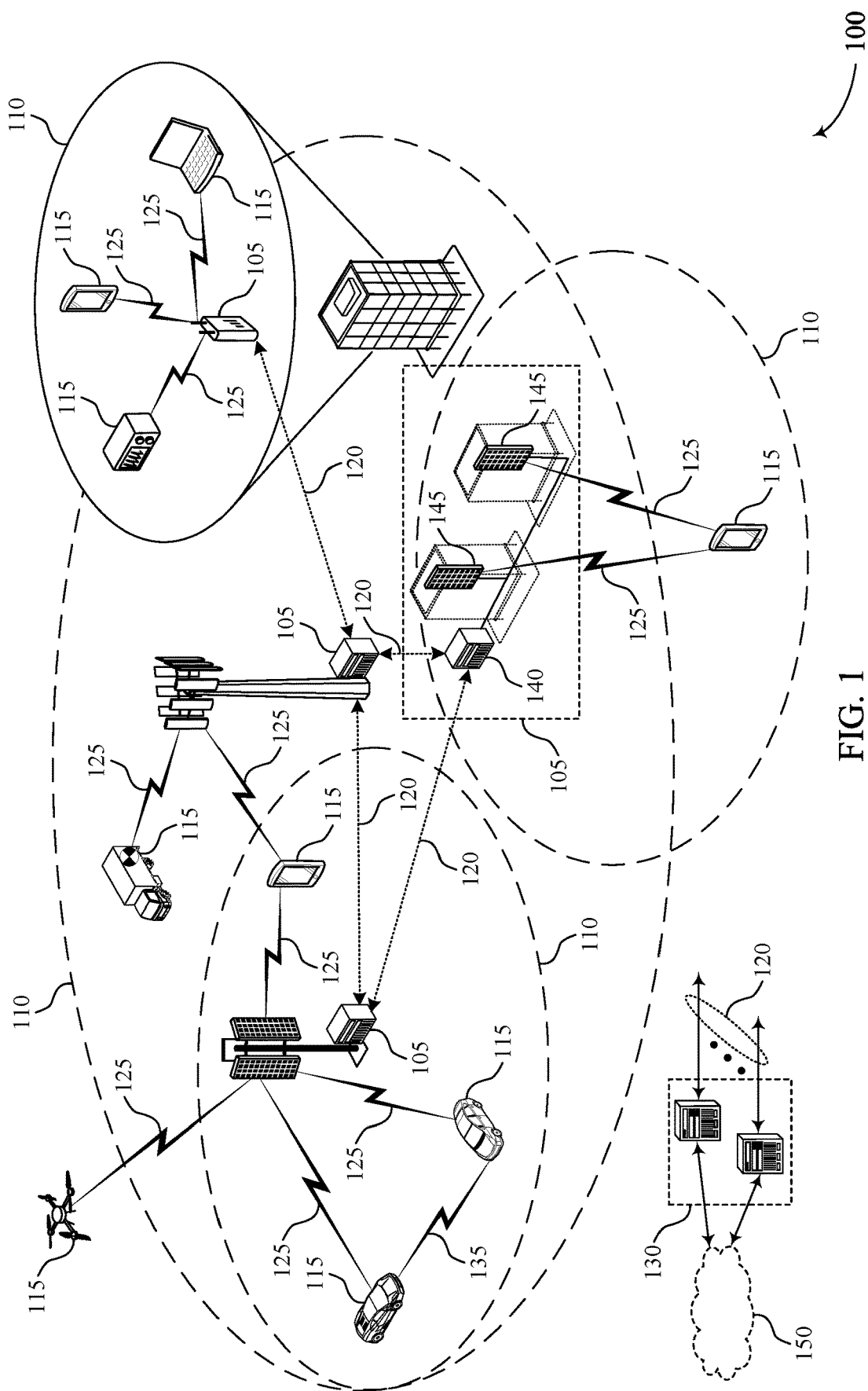
FIG. 1 illustrates an example of a wireless communications system that supports uplink repetition configuration in accordance with aspects of the present disclosure.

The described techniques relate to improved methods, systems, devices, and apparatuses that support uplink repetition configuration. Generally, the described techniques provide for configuring a user equipment (UE) to repeat uplink transmissions using different communication resources, such as different sounding reference signal (SRS) resources. For example, a UE may be configured to receive (e.g., from a base station) a downlink control message, such as downlink control information (DCI) via a physical downlink control channel (PDCCH), that schedules resources for transmitting repetitions of an uplink channel transmission (e.g., a physical uplink shared channel (PUSCH)). In some examples, each of the repetitions of the uplink channel transmission may correspond to a single transport block (TB), such as a same TB, and the repetitions may each be configured to carry the information of the TB.

To support transmission of the repetitions, the UE may identify an SRS resource indicator (SRI) or SRI field of the downlink control message, and determine a plurality of SRS resources based on the SRI or SRI field. According to various techniques, the UE may transmit the repetitions of the uplink channel transmission (e.g., repetitions of the TB, PUSCH repetitions), where the transmitting includes transmitting a first of the repetitions according to a first sounding reference signal resource of the plurality of sounding reference signal resources, and transmitting a second of the repetitions according to a second sounding reference signal resource of the plurality of sounding reference signal resources. In other words, the UE may transmit different instances of an uplink channel transmission repetition according to different SRS resources, which may be based on (e.g., configured by) an SRI or SRI field received from a scheduling entity such as a base station.

By applying the described techniques for uplink repetition, a wireless communications system may support more reliable communications, more efficient communications, or both. For example, where different SRS resources correspond to different resources in the spatial domain (e.g., different spatial layers, different beams, different codebooks, different antennas or sets of antennas, different antenna ports), the described techniques for uplink repetitions may support enhanced uplink coverage and diversity gains. For example, uplink coverage enhancement may be realized by repeating an uplink channel transmission (e.g., a TB transmission) over multiple PUSCH transmissions, and diversity gains may be realized by repeating an uplink channel transmission using different spatial resources (e.g., different antennas or sets of antennas, different beams, different precoders). Moreover, by applying the described techniques for uplink repetition, such gains may be realized with relatively limited control signaling. For example, the described techniques may utilize various configuration (e.g., preconfiguration, lookup tables or other lookup resources) between a base station and a UE, such that downlink control signaling corresponding to a particular uplink transmission (e.g., an instance of DCI, an uplink grant) can indicate resources for uplink transmission repetition more efficiently than when such configuration between a base station and a UE are not applied.

Aspects of the disclosure are initially described in the context of wireless communications systems. Aspects of the disclosure are further illustrated by and described with reference to apparatus diagrams, system diagrams, and flowcharts that relate to uplink repetition configuration.

FIG. 1 illustrates an example of a wireless communications system 100 that supports uplink repetition configuration in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming, or may be otherwise associated with different transmission or reception directions. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers (e.g., different resources in the spatial domain). Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may be configured to support various examples for uplink repetition configuration described herein. For example, a UE 115 in accordance with the present disclosure may be configured to receive a downlink control message (e.g., downlink control information, a PDCCH) that schedules resources for transmitting repetitions of an uplink channel transmission. The UE 115 may identify from the downlink control message a sounding reference signal resource indicator (e.g., an SRI), and determine a plurality of sounding reference signal resources based at least in part on the sounding reference signal resource indicator. Accordingly, the UE 115 may transmit the repetitions of the uplink channel transmission, where the transmitting includes transmitting a first of the repetitions according to a first sounding reference signal resource of the plurality of sounding reference signal resources and transmitting a second of the repetitions according to a second sounding reference signal resource of the plurality of sounding reference signal resources.

Figure 2:
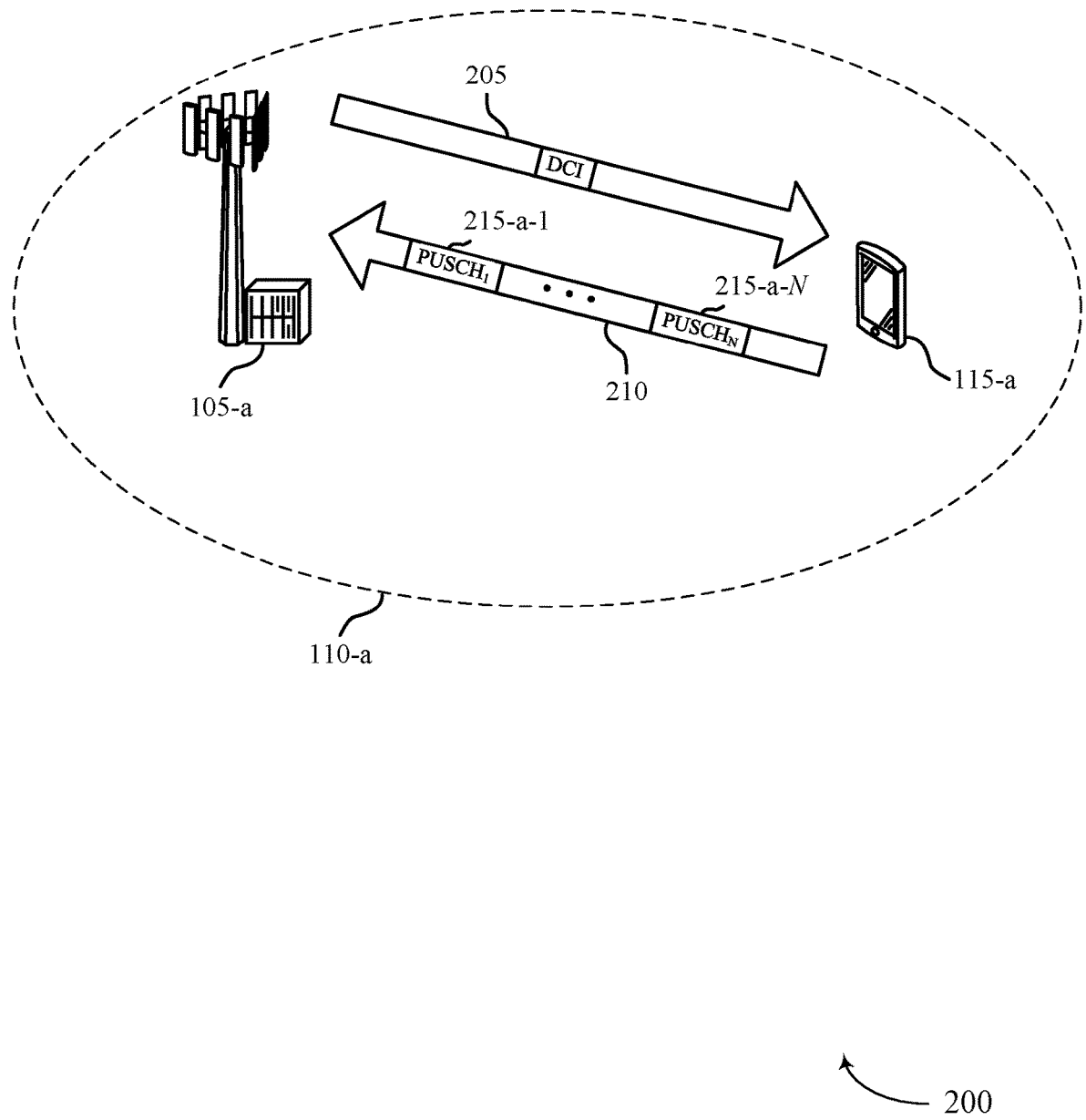
FIG. 2 illustrates an example of a wireless communications system that supports uplink repetition configuration in accordance with aspects of the present disclosure.

FIG. 2 illustrates an example of a wireless communications system 200 that supports uplink repetition configuration in accordance with aspects of the present disclosure. The wireless communications system 200 includes a base station 105-a and a UE 115-a, which may be examples of the corresponding devices described with reference to FIG. 1. The base station 105-a may provide communication coverage to UEs 115 within coverage area 110-a. In some examples, wireless communications system 200 may implement aspects of the wireless communications system 100.

The wireless communications system 200 may support uplink communications based on a scheduling or allocation of resources, for example, by the base station 105-a. In some examples, the base station 105-a may determine available communication resources (e.g., one or more determined bandwidths or bandwidth parts of a radio frequency spectrum over one or more time intervals), and the base station 105-a may allocate resources to one or more UEs 115 for the respective UEs 115 to transmit uplink transmissions. In some examples, the uplink transmissions may be associated with an unlicensed spectrum, and the base station 105-a may determine available communication resources based at least in part on performing a carrier sensing operation, a listen-before-talk (LBT) operation, or some other operation to determine that a bandwidth or one or more bandwidth parts of the unlicensed spectrum are available (e.g., not being used by another transmitting device, not reserved by another transmitting or receiving device).

The base station 105-a may transmit a downlink control message 205 (e.g., to the UE 115-a), which may include one or more indications of resource allocations determined for the UE 115-a (e.g., indications of resources allocated to or configured for the UE 115-a, in the time domain, in the frequency domain, in the spatial domain). In some examples, the downlink control message 205 may include, be associated with, or be referred to as an uplink grant. In some examples, the downlink control message 205 may be conveyed via a PDCCH. The downlink control message 205 may include a DCI portion (e.g., a single instance of DCI) that schedules resources for the UE 115-a to transmit an uplink transmission 210 (e.g., repetitions of a PUSCH corresponding to a transport block).

Based on receiving the downlink control message 205, the UE 115-a may transmit an uplink transmission 210 using the allocated resources indicated by the downlink control message 205 (e.g., to perform uplink communications with the base station 105-a). In accordance with aspects of the present disclosure, the uplink transmission 210 may include a plurality of PUSCH repetitions 215-a (e.g., N repetitions, corresponding to PUSCH repetitions 215-a-1 through 215-a-N) each containing or conveying information from a same transport block (TB) within a repetition window (e.g., a duration or interval during which repetitions are configured). Each of the PUSCH repetitions 215-a may be transmitted according to a respective SRS resource of a plurality of SRS resources as indicated by an SRI or SRI field of the downlink control message 205 (e.g., of the DCI). In some examples, a single instance of DCI of the downlink control message (e.g., a single PDCCH transmission) may schedule, allocate, or otherwise indicate resources and configuration for all of the PUSCH repetitions 215-a.

For example, according to some communication standards, which may apply to ultra-reliable low-latency communications (URLLC), a single instance of DCI may be configured for scheduling uplink resources for a transport block over multiple PUSCH instances (e.g., multiple PUSCH transmissions corresponding to a single TB), which may be an example of a communication configuration that supports PUSCH repetition for the TB. In such examples, a scheduling DCI may indicate communication resources (e.g., uplink resources, resources in the frequency domain, resources in the time domain, resources in the spatial domain), redundancy indicators (e.g., an RV indicator), a modulation and coding scheme (MCS), a rank indicator, a precoder, or other configurations for a group of PUSCH transmission instances (e.g., a group of PUSCH repetitions 215, repetitions of a TB).

In some examples, supporting repetition-based transmission may reduce scheduling delay in the wireless communications system 200. For example, if the uplink transmission 210 (e.g., a transmission of an uplink TB including one or more PUSCH repetitions 215-a) requires a plurality of symbol durations, which may exceed a number of symbol durations remaining in a current slot, the described techniques may support scheduling of the uplink transmission 210 in a current slot, rather than deferring the scheduling to a subsequent slot (e.g., avoiding scheduling at least a portion of the uplink transmission 210 in a next slot). In some examples, the uplink transmission 210 may be scheduled as soon as possible, and the described techniques may support the uplink transmission 210, or a PUSCH repetition 215 thereof, being split across two slots (e.g., where a PUSCH repetition 215, or a sequence of PUSCH repetitions 215, is configured in the time domain to overlap a slot boundary). In other words, in accordance with the described techniques, the uplink transmission 210 including PUSCH repetitions 215-a for a TB may be scheduled across slots or slot boundaries. In some examples, the wireless communications system 200 may support scheduling a transmission of a TB in the uplink transmission 210 over multiple PUSCH repetitions 215-a using a single instance of DCI (e.g., of the downlink control message 205), which may reduce signaling overhead associated with transmitting the TB (e.g., compared with other, less efficient configurations).

In some examples, a PUSCH repetition mode or configuration may be enabled to support diversity gains or otherwise enhancing uplink coverage. For example, uplink coverage enhancements may be realized by repeating a TB transmission over multiple PUSCHs (e.g., repeating a TB across multiple PUSCH repetitions 215). Diversity gains may be realized by repeating a TB transmission with different spatial resources, such as transmitting PUSCH repetitions 215 with different beams or precoders, or transmitting PUSCH repetitions 215 using different antennas or sets of antennas (e.g., different panels). For example, in a scenario where the base station 105-a is associated with multiple TRPs, a TB can be transmitted using two PUSCH repetitions 215-a that are transmitted with different spatial resources (e.g., different beams, different precoders, different antenna panels), where a first of the PUSCH repetitions 215-a may be transmitted with spatial resources generally directing the transmission towards one TRP and a second of the PUSCH repetitions 215-a may be transmitted with spatial resources generally directing the transmission towards another TRP. Thus, if a communication link with one of the TRPs is blocked (e.g., physically blocked, subject to interference that degrades the communication link), there is still a chance that a PUSCH repetition 215-a directed toward the other TRP may be received and decoded successfully by the other TRP. In some examples, such a diversity gain may be supported by associating each of the PUSCH repetitions 215-a with different resource allocation parameters.

As used herein, an instance of a PUSCH repetition 215 may refer to any of the repeated PUSCH transmissions corresponding to the same TB. For example, a TB scheduled with three PUSCH repetitions 215 may correspond to a scheduling or other configuration of three separate instances of a PUSCH transmission for the TB, where each of the PUSCH repetitions 215 may convey the information of the TB (e.g., each of the PUSCH repetitions 215 may contain repetitions of the information of the TB). In various examples, the TB (e.g., each instance of a PUSCH repetition 215) may be transmitted over a single layer, or multiple layers, either of which may support various techniques for enhancing uplink coverage or diversity. Each PUSCH repetition 215, or a group of PUSCH repetitions 215 within a repetition window, may be transmitted using certain spatial resources (e.g., resources in the spatial domain), such as a particular beam, a particular precoder, or a particular panel (e.g., a panel associated with one or more antennas). Between different PUSCH repetitions 215, or between different groups of PUSCH repetitions 215 within a repetition window, certain assumptions may change, such as applying different communication resources (e.g., different spatial resources, different precoders, different panels) between the different PUSCH repetitions 215 or groups of PUSCH repetitions 215 within the repetition window.

In some examples, such as where the base station 105-a is associated with multiple TRPs, a perfect backhaul may be assumed for the base station 105-a. In some examples, such an assumption may support a single instance of DCI, or a single scheduling entity, being used to schedule the transmissions intended for different TRPs (e.g., different instances of PUSCH repetitions 215 that are configured to be directed to the different TRPs). In some examples, open-loop parameters used for transmission of each PUSCH repetition 215, or a group of PUSCH repetitions 215, may be different from other PUSCH transmissions. For example, such parameters may be managed differently if different PUSCH transmissions are intended to be received by different TRPs. In some examples according to the described techniques, such scheduling of PUSCH repetitions 215 may be accomplished with a single instance of DCI.

In some examples (e.g., according to certain communications standards), the wireless communications system 200 may support a codebook based transmission mode, a non-codebook based transmission mode, or both, and codebook based transmission and non-codebook based transmission modes may employ various techniques for indicating parameters such as quantities of layers, precoders, and antennas (e.g., panels). In one example, the UE 115-a may be configured with multiple SRS resources (e.g., multiple sets of resources corresponding to a sounding reference signal), where the usage of each SRS resource can be set by a configuration (e.g., an RRC configuration, a DCI indication) with various parameters such as "codebook based transmission," "non-codebook based transmission," "antenna switching," "beam management," or others.

In some examples of codebook based transmission, precoders used at the UE 115-a may be explicitly defined (e.g., predefined, preconfigured, configured by an RRC configuration), such as a definition by way of a precoder matrix. Particular precoders may be indicated between the UE 115-a and the base station 105-a using a transmit precoder matrix indicator (TPMI) value. For a transmission by the UE 115-a that is scheduled by the base station 105-a, the base station 105-a may explicitly command the UE 115-a (e.g., with a DCI indication) which of the defined precoders to use (e.g., in a TPMI included in or otherwise associated with an uplink grant). In some examples, to support a codebook based transmission mode, the UE 115-a may transmit SRS transmissions using an isotropic beam, and the base station 105-a may learn or identify signal quality characteristics to help inform a determination by the base station 105-a of which of the defined precoders the UE 115-a should use in a transmission.

In some examples of non-codebook based transmissions, precoders used at the UE 115-a may not be explicitly defined, but parameters associated with different spatial resources (e.g., beams, antennas, antenna panels) may be otherwise indicated by an SRI. For example, the UE 115-a may transmit instances of sounding reference signals using respective SRS resources. The base station 105-a may learn or identify signal quality characteristics that correspond to the respective SRIs, and when scheduling uplink communications, the base station 105-a may indicate to the UE 115-a, using an SRI rather than a TPMI (e.g., rather than a beam or precoder itself), to use the same beams that were used for certain SRS resources for transmitting the uplink communications (e.g., a PUSCH transmission).

In some examples (e.g., for a non-codebook based PUSCH transmission mode), the UE 115-a may be configured with at most one SRS resource set, which may include, indicate, or otherwise refer to a set of one or more SRS resources. A maximum quantity of SRS resources that can be configured for non-codebook based uplink transmission may be four (e.g., a set of four SRS resources) where, in some examples, each of the SRS resources may include or otherwise correspond to a particular spatial layer. For example, an SRS resource may be associated with a configuration or parameter (e.g., a spatial resource) for transmission of an SRS by the UE 115-a, which may be used to train the UE 115-a or the base station 105-a for communications over a given spatial layer (e.g., to train a channel for communications between the UE 115-a and the base station 105-a).

If the UE 115-a is configured to transmit a PUSCH according to a non-codebook transmission mode, an SRI field in DCI may indicate a PUSCH precoder and the transmission rank. An SRI field in DCI may be referred to as a sounding reference signal resource indicator that may be identified (e.g., by the UE 115-a) from the downlink control message 205, and may refer to one or more bits of control information that indicate a set of one or more SRS resources. For example, a value indicated by the one or more bits of an SRI field may correspond to a field of an SRS or SRI resource table, or some other lookup resource. In some cases for non-codebook based PUSCH (e.g., when the UE 115-a, or a PUSCH transmission thereof, is configured with a non-codebook based transmission mode, when the UE 115-a is configured with a higher layer parameter txConfig=nonCodebook), a quantity of bits, $n_{SRI,non-codebook}$, included in an SRI field may be given by the following:

$$n_{SRI,non-codebook} = \left\lceil \log_2\left( \sum_{k=1}^{\min\{L_{max}, N_{SRS}\}} \binom{N_{SRS}}{k} \right) \right\rceil \quad (1)$$

where $N_{SRS}$ may be equal to a quantity of configured SRS resources in an SRS resource set (e.g., a quantity of SRS resources associated with or otherwise available to the non-codebook based transmission mode, a quantity of SRS resources associated with a higher layer parameter usage of value 'nonCodebook', a quantity of SRS resources within the configured set), and $L_{max}$ may refer to a maximum quantity of spatial layers (e.g., MIMO layers) supported by the UE 115-a. In some examples, if the UE 115-a supports operation with maxMIMO-Layers and a higher layer parameter maxMIMO-Layers of PUSCH-ServingCellConfig of the serving cell is configured, $L_{max}$ may be given by that parameter, otherwise, $L_{max}$ may be given by the maximum number of layers for PUSCH supported by the UE 115-a for the serving cell (e.g., of the base station 105-a) for non-codebook based operation.

One example of an SRS configuration table for indicating transmission rank and precoders (e.g., in a non-codebook based transmission mode) is illustrated by Table 1 below, which may be an example of an SRS or SRI table or lookup resource corresponding to a configuration of $L_{max}=2$ (e.g., a table selected based at least in part on a maximum quantity of spatial layers supported by the UE 115-a):

TABLE 1

SRI indication for non-codebook based PUSCH transmission, $L_{max} = 2$

| Bit field mapped to index | SRI(s), $N_{SRS} = 2$ | Bit field mapped to index | SRI(s), $N_{SRS} = 2$ | Bit field mapped to index | SRI(s), $N_{SRS} = 2$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
| | | 4 | 0, 2 | 4 | 0, 1 |
| | | 5 | 1, 2 | 5 | 0, 2 |
| | | 6-7 | reserved | 6 | 0, 3 |
| | | | | 7 | 1, 2 |
| | | | | 8 | 1, 3 |
| | | | | 9 | 2, 3 |
| | | | | 10-15 | reserved |

In the example of Table 1, one or more SRIs or SRS resources may be indicated by a value of the corresponding bit field (e.g., an SRI field of DCI), where such a mapping (e.g., an appropriate column of Table 1) may be based at least in part on a quantity of configured sounding reference signal resources (e.g., $N_{SRS}$). Each of the individual SRIs indicated by the SRI field may correspond to a particular SRS resource, and may correspond to or map to a particular transmission rank, a particular precoder, or a particular combination of transmission rank and one or more precoders.

In some examples (e.g., for a non-codebook based transmission mode), the quantity of SRS resources in a field may indicate a rank of transmission, and a precoder may be the same as the one used for SRS transmission (e.g., by the UE 115-a). For example, an SRI=0 may point to a first SRS resource (e.g., a first set of one or more parameters that may correspond to a first SRS transmission by the UE 115-a, a first precoder, a first beam, a first antenna or set of antennas, SRS resource 0), and an SRI=1 may point to a second SRS resource (e.g., a second set of one or more parameters that may correspond to a second SRS transmission by the UE 115-a, a second precoder, a second beam, a second antenna or set of antennas, SRS resource 1). In such an example, a bitfield mapped to index=0 may correspond to or indicate the first SRS resource, a bitfield mapped to the index=1 may correspond to or indicate the second SRS resource, and a bitfield mapped to index=4 may correspond to or indicate a set including the first SRS resource and the second SRS resource.

A PUSCH precoder may be indicated by various techniques. In one example, the UE 115-a may calculate or otherwise determine the precoder used for the transmission of SRS based on a measurement of an associated non-zero power (NZP) channel state information reference signal (CSI-RS) resource. For example, the UE 115-a may monitor for an NZP-CSI-RS resource associated with or otherwise corresponding to an SRS, and measure the downlink channel. Based on the measurement, the UE 115-a may select or determine a given precoder for use in uplink transmissions (e.g., for an uplink channel, for transmission of sounding reference signals). The associated NZP-CSI-RS may by indicated via SRS request field in DCI (e.g., according to a DCI format 0_1, according to a DCI format 1_1), where parameters indicating one or more of an association between aperiodic SRS triggering state and SRS resource sets (e.g., a parameter AperiodicSRS-Resource Trigger), triggered SRS resources (e.g., a parameter srs-ResourceSetId), or associated NZP-CSI-RS-ResourceId (e.g., a parameter csi-RS) may refer to higher-layer configured parameters (e.g., parameters configured in an SRS-ResourceSet). In some examples, an indicated SRI in a slot n may be associated with a most recent transmission of SRS resource(s) identified by the SRI, where the SRS transmission may be prior to the PDCCH carrying the SRI.

In some cases for codebook based PUSCH (e.g., when the UE 115-a, or a PUSCH transmission thereof, is configured with a codebook based transmission mode, when the UE 115-a is configured with a higher layer parameter txConfig=Codebook), a quantity of bits, $n_{SRI,codebook}$, included in an SRI field may be given by the following:

$$n_{SRI,codebook} = \lceil \log_2(N_{SRS}) \rceil \quad (1)$$

where $N_{SRS}$ may be equal to a quantity of configured SRS resources in an SRS resource set (e.g., a quantity of SRS resources associated with or otherwise available to the codebook based transmission mode, a quantity of SRS resources associated with a higher layer parameter usage of value 'CodeBook', a quantity of SRS resources within the configured set). In such examples, the UE 115-a may determine its SRS resources, such as a PUSCH transmission precoder, based on an SRI (e.g., SRI field), a precoder matrix indicator (e.g., a TPMI) and a transmission rank. In some examples, one or more of an SRI, a TPMI, or a transmission rank may be given by DCI fields (e.g., of the downlink control message 205) of an SRS resource indicator, precoding information, and a number of layers.

In some examples, TPMI and layer indications may be given in a configured lookup resource such as a table (e.g., a configured table, known by the base station 105-a and the UE 115-a, for precoding information and number of layers, which, in some examples, may be based at least in part on, or otherwise correspond to a quantity of antenna ports, whether a transform precoder is enabled or disabled, a maximum rank, or other configured parameters). A TPMI may be used to indicate a precoder to be applied over a set of spatial layers (e.g., a set of layers {0 ... v−1}), which may correspond to an SRS resource selected by or indicated by an SRI when multiple SRS resources are configured (e.g., an indicated one of a plurality of antenna panels), or, if a single SRS resource is configured (e.g., a single antenna panel), a TPMI may be used to indicate a precoder to be applied over the spatial layers (e.g., a set of layers {0 ... v−1}) that correspond to that SRS resource. In some examples, a maximum quantity of configured SRS resources for codebook based transmission may be two. Similar to configurations for non-codebook based transmission, in some examples of codebook based transmission, an indicated SRI in slot n may be associated with a most recent transmission of SRS resource identified by the SRI, where the SRS resource is prior to the PDCCH carrying the SRI.

In accordance with the described techniques for uplink repetition configuration, an SRI field may be used point to SRS resources to be used for the transmission of PUSCH repetitions 215-a. To reduce overhead signaling (e.g., reduce a size of DCI), the described uplink repetitions may reuse an SRI field, but with a different interpretation than prior uses (e.g., according to prior standards). In some examples, the base station 105-a may inform the UE 115-a of whether the UE 115-a should interpret the SRI field based on the prior behavior, or a new behavior that supports the described uplink repetition. For example, the base station 105-a may configure the UE 115-a to interpret an SRI field in one manner or another based at least in part on RRC signaling (e.g., a configuration prior to the particular scheduling and transmission of an uplink transport block). Thus, according to various techniques described herein, the UE 115-a may interpret an SRI field received via the downlink control message 205, and transmit, in the uplink transmission 210, the PUSCH repetitions 215-a according to various mapping of SRS resources based at least in part on the configured interpretation behavior for the SRI field.

Figure 3:
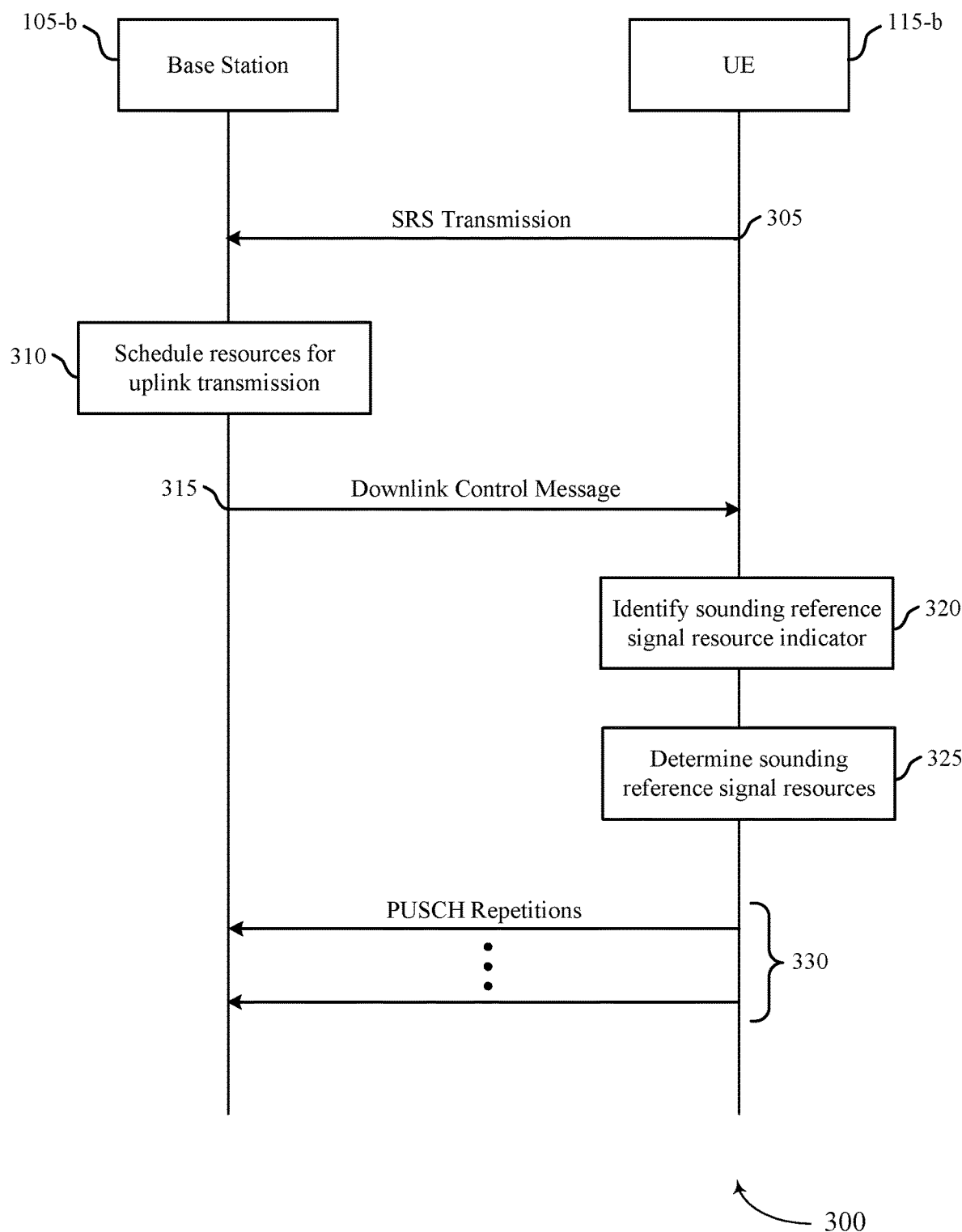
FIG. 3 illustrates an example of a wireless communications system and corresponding operations that support uplink repetition configuration in accordance with aspects of the present disclosure.

FIG. 3 illustrates an example of a wireless communications system 300 and corresponding operations that support uplink repetition configuration in accordance with aspects of the present disclosure. In some examples, the wireless communications system 300 may implement aspects of wireless communications systems 100 or 200 described with reference to FIG. 1 or 2. The wireless communications system 300 may include a base station 105-b and a UE 115-b, and may illustrate aspects of scheduling and mapping resources for a plurality of PUSCH repetitions (e.g., PUSCH repetitions 215 described with reference to FIG. 2).

At 310, the base station 105-b may schedule resources for an uplink transmission (e.g., an uplink transmission 210 described with reference to FIG. 2). For example, the base station 105-b may select and allocate communication resources in the time domain, in the frequency domain, or both, for use by the UE 115-b. In some examples, the base station 105-b may determine an availability of such resources based on a listen-before-talk (LBT) or other contention operation (e.g., when utilizing resources of an unlicensed or shared spectrum). In some examples, the scheduled uplink transmission may correspond to a single transport block (e.g., a single uplink transport block). In some examples, the scheduling of resources at 310 may be responsive to a request for resources from the UE 115-b, such as a random access request.

In some examples, the scheduling of resources at 310 may include the base station 105-b assigning, mapping, or otherwise configuring certain SRS resources for repetitions of the scheduled uplink transmission. In some examples, at 305 (e.g., prior to the scheduling of resources at 310), the UE 115-b may transmit one or more sounding reference signals, which may be received by the base station 105-b. The SRS transmissions may include an indication of respective SRS resources used for a given SRS, such that the base station 105-b may associate signal quality characteristics with respective ones of the SRS resources. Accordingly, the base station 105-b may select certain SRS resources for the UE 115-b to use in the scheduled uplink transmission based on such an association of signal quality characteristics. In other examples, operations of 305 may be omitted, and the base station 105-b may indicate an SRS mapping or other configuration for PUSCH repetitions without prior reception or measurement of sounding reference signals from the UE 115-b.

At 315, the base station 105-b may transmit a downlink control message, such as a PDCCH transmission, which may include an instance of DCI. In some examples, the downlink control message may include or otherwise correspond to an uplink grant or other signaling of allocated communication resources in the time domain or frequency domain. The downlink control message may be received and decoded by the UE 115-b to interpret such a resource allocation. The downlink control message may include a sounding reference signal resource indicator (e.g., an SRI field of DCI) which may indicate a plurality of SRS resources (e.g., as determined as part of the operations of 310).

At 320, the UE 115-b may identify the SRS indicator of the downlink control message, such as an SRI field in the instance of DCI. For example, the UE 115-b may receive and decode the downlink control message of 315, and identify a value of an SRI field.

At 325, the UE 115-b may determine a plurality of SRS resources based on the SRS indicator. For example, the UE 115-b may identify a sounding reference signal resource indicator table or other lookup reference, and identify a field or value of the table or other lookup reference based at least in part on the sounding reference signal resource indicator, where the field indicates the plurality of sounding reference signal resources.

At 330, the UE 115-b may transmit a plurality of PUSCH repetitions (e.g., PUSCH repetitions 215 described with reference to FIG. 2), which may be an example of transmitting repetitions of an uplink channel transmission. The transmissions at 330 may include transmitting a first of the repetitions according to a first sounding reference signal resource (e.g., of the plurality of sounding reference signal resources determined at 325) and transmitting a second of the repetitions according to a second sounding reference signal resource. The PUSCH repetitions transmitted at 330 may be mapped to the plurality of SRS resources determined at 325 according to various techniques, which may be supported by a single instance of DCI in the downlink control message of 315.

A first example of mapping SRS resources determined at 325 to the PUSCH repetitions of 330 may be applied to or considered in the context of a non-codebook based transmission mode. In some examples, each of the PUSCH repetitions of 330 may be limited to a single spatial layer, but in other examples each of the PUSCH repetitions of 330 may be transmitted over more than one spatial layer. In a non-codebook based transmission mode configured for the described techniques for uplink repetition, an SRI field may have a different interpretation (e.g., as compared to a prior use case or behavior). For example, in one use case (e.g., a prior use case), an SRI field may be used to indicate a set of one or more SRS resources for a transmission using a particular resource allocation (e.g., a set of one or more spatial layers for a transmission according to a same set of time domain and frequency domain resources, a set of one or more spatial layers for a MIMO transmission). When more than one SRS resource is indicated by an SRI field in such a use case, the SRS resources may be applied simultaneously for a given transmission. For example, when two SRS resources associated with two different beams are indicated, the two SRS resources may be combined together (e.g., simultaneously) to provide an effective beam or effective direction that is different than either of the single beams associated with the respective indicated SRS resources.

In another use case (e.g., to support the described techniques of uplink repetition for uplink coverage enhancement), an SRI field may alternatively be used to indicate a plurality of SRS resources that are to be mapped to different transmissions (e.g., distinct PUSCH repetitions) according to communications resources that are different in the time domain or frequency domain (e.g., mapped to distinct PUSCH repetitions that are sequential in the time domain). The base station 105-*b* may inform the UE 115-*b* whether to interpret the SRI field based on one use case or another, such as configuring the UE 115-*b* to interpret the SRI field according to the new behavior or a prior behavior (e.g., as part of RRC signaling between the base station 105-*b* and the UE 115-*b*, not shown). In some examples, such an approach may support performing the described techniques for uplink repetition without increasing DCI payload or signaling for a given uplink transmission.

According to an example of uplink repetition in the context of a non-codebook based transmission mode, the base station 105-*b* and the UE 115-*b* may select an SRI table based on a maximum quantity of spatial layers supported by the UE 115-*b* (e.g., a value of $L_{max}$), which may be configured at the UE 115-*b* and conveyed to the base station 105-*b* during connection establishment (e.g., via RRC signaling). As part of the scheduling of resources at 310, the base station 105-*b* may determine a plurality of SRS resources for the UE 115-*b* to use in the uplink transmissions of 330, and the base station may select a value for an SRI field that corresponds to the plurality of SRS resources in the selected table. In some examples, a field of the table may be further based on a quantity of configured SRS resources in the non-codebook SRS resource set (e.g., a value of $N_{SRS}$). Accordingly, the value of the SRI field may identify one row within the table from the column given by $N_{SRS}$ for the non-codebook based SRS resource set. The UE 115-*b* may receive the value of the SRI field that corresponds to the plurality of SRS resources determined by the base station 105-*b* and may apply the plurality of SRS resources (e.g., one at a time) to instances of the PUSCH repetitions of 330.

In one example, the described techniques for uplink repetition configuration may be illustrated with reference to Table 1, where an interpretation of the indications of Table 1 may be modified or reconfigured in the context of uplink repetition scheduling. For example, where the UE 115-*b* supports a maximum of two spatial layers (e.g., where $L_{max}=2$) and the UE 115-*b* is configured with four SRS resources (e.g., $N_{SRS}=4$), the base station 105-*b* may convey a value of 7 in an SRI field (e.g., of DCI conveyed in the downlink control message transmitted at 315) to indicate a set of SRS resources {1,2}, which may refer to a set of SRS resources corresponding to SRI=1 and SRI=2. Using a repetition factor (e.g., a value of K), given either via the downlink control message of 315 or prior RRC signaling, the UE 115-*b* may transmit PUSCH repetitions via the different SRIs (e.g., SRS resources corresponding to either SRI=1 or SRI=2). For example, assuming a repetition factor of K=2, a first instance of PUSCH repetition (e.g., $PUSCH_1$) may be transmitted as a single layer transmission using the precoder associated with an SRS resource indicated by SRI=1, and a second instance of PUSCH repetition (e.g., $PUSCH_2$, a later PUSCH repetition) may be transmitted as a single layer transmission using the precoder associated with an SRS resource indicated by SRI=2.

In another example, a repetition factor of K=4 may be considered in the context of the above parameters (e.g., where $L_{max}=2$ and $N_{SRS}=4$, and an SRI field of 7 indicates a set of SRIs {1,2}), and different mapping techniques may be used to apply the SRS resources corresponding to SRI=1 and SRI=2 to four PUSCH repetitions. For example, referring to mapping of a sequence of four PUSCH repetitions (e.g., a sequence in the time domain, or other mapping sequence), SRI values may be mapped as a set {1,1,2,2} of single-layer transmissions in a back-to-back approach, or a set {1,2,1,2} of single-layer transmissions in a cycling approach, either of which may be configured between the base station 105-*b* and the UE 115-*b*. Each of these sets may illustrate examples of SRS resource mapping that supports uplink coverage enhancement by both repetition (e.g., multiple PUSCH repetitions for a given spatial resource) and transmit diversity (e.g., different PUSCH repetitions using different spatial resources).

In yet another example, a repetition factor of K=4 may be considered in the context of an indicated set of SRIs {1,2,3}, and again, different mapping techniques may be used to apply the SRS resources corresponding to SRI=1, SRI=2, and SRI=3 to four PUSCH repetitions, where each PUSCH repetition is transmitted according to a single spatial layer. For example, referring to mapping of a sequence of four PUSCH repetitions (e.g., a sequence in the time domain, or other mapping sequence), SRI values may be mapped as a set {1,1,2,3}, {1,2,2,3}, or {1,2,3,3} in a back-to-back approach, or a set {1,2,3,1} in a cycling approach, either of which may be configured between the base station 105-*b* and the UE 115-*b*. In various examples, the base station 105-*b* may configure the UE 115-*b* to perform SRS resource mapping according to either a back-to-back approach or a cycling approach (e.g., via RRC configuration, via a configuration included in the downlink control message of 315).

To indicate the SRI for each single-layer PUSCH repetition within a repetition window, various alternatives can be considered for interpreting a repetition factor. In one alternative for interpreting a repetition factor, a value of K may be associated with a quantity of repetitions for each SRI or SRS resource. For example, for an indicated set of SRIs={1, 2,3}, and K=1, a mapping of the SRIs to a sequence of PUSCH may be given as a set {1,2,3} (e.g., PUSCH$_1$ transmitted according to the SRS resources corresponding to SRI=1, PUSCH$_2$ transmitted according to the SRS resources corresponding to SRI=2, and PUSCH$_3$ transmitted according to the SRS resources corresponding to SRI=3). For an indicated set of SRIs={1,2,3}, and K=2, a mapping of the SRIs to a sequence of PUSCH may be given as a set {1,1,2,2,3,3} (e.g., PUSCH$_1$ transmitted according to the SRS resources corresponding to SRI=1, PUSCH$_2$ transmitted according to the SRS resources corresponding to SRI=1, and PUSCH$_3$ transmitted according to the SRS resources corresponding to SRI=2, and so on). In some examples, there may be a higher likelihood of decoding PUSCH repetitions more quickly when using a back-to-back mapping approach.

In another alternative for interpreting a repetition factor, a value of K may be associated with a total quantity of PUSCH repetitions in a repetition window, and whether the UE 115-b is to transmit PUSCH repetitions with a same SRI value in a back-to-back approach, or cycle through SRI values, may be indicated to the UE 115-b (e.g., via RRC signaling). For example, if the UE 115-b is configured to apply a cycling approach, for an indicated set of SRIs={1, 2,3}, and K=4, a mapping of the SRIs to a sequence of PUSCH repetitions may be given as a set {1,2,3,1} (e.g., PUSCH$_1$ transmitted according to the SRS resources corresponding to SRI=1, PUSCH$_2$ transmitted according to the SRS resources corresponding to SRI=2, PUSCH$_3$ transmitted according to the SRS resources corresponding to SRI=3, and PUSCH$_4$ transmitted according to the SRS resources corresponding to SRI=1). If the UE 115-b is configured with transmitting the same set of SRIs in a back-to-back approach, a mapping of the SRIs to a sequence of PUSCH may be given as a set {1,1,2,3} or {1,2,3,3}. Given such alternatives in a back-to-back approach, and other considerations, a cycling approach may be easier to indicate than a back-to-back approach in some examples.

The techniques described above may provide full flexibility in terms of indicating spatial resources (e.g., beams, precoders) for each PUSCH repetition, but may be limited to single-layer transmissions. Further techniques may be considered to allow transmission of PUSCH repetitions according to more than one spatial layer.

In one example, the payload size of DCI may be increased, such as including an additional SRI field in DCI, where the presence of such an additional SRI field may be configurable. When an additional SRI field is configured and present, the UE 115-b may transmit K repetitions by applying SRS resources according to either a cycling approach or a back-to-back approach as discussed above. For example, considering a scenario where $L_{max}$=2 and K=4, a first SRI field having a value of 5 may indicate an SRI set of {0,2} (e.g., according to Table 1) and a second SRI field having a value of 7 may indicate an SRI set of {1,2}. Accordingly, a mapping of the SRIs to a sequence of PUSCH repetitions may be given as a set {{0,2},{1,2},{0,2},{1,2}} (e.g., a multi-layer PUSCH$_1$ transmitted according to a combination of SRS resources corresponding to SRI=0 and SRI=1, a multi-layer PUSCH$_2$ transmitted according to a combination of SRS resources corresponding to SRI=1 and SRI=2, a multi-layer PUSCH$_3$ transmitted according to a combination of SRS resources corresponding to SRI=0 and SRI=1, and a multi-layer PUSCH$_4$ transmitted according to a combination of SRS resources corresponding to SRI=1 and SRI=2)

In another example, if increasing DCI size is undesirable or not feasible, some fields of DCI may be jointly encoded or decoded for indicating SRS resources of multi-layer PUSCH repetitions. However, although supporting relatively smaller DCI payload, such an approach may be associated with other tradeoffs regarding PUSCH transmission configurations. In one example, an SRI field and a redundancy version (RV) indicator may be jointly encoded to indicate SRS resources for different PUSCH repetitions, such as the joint encoding of Table 2 below:

TABLE 2

| | Joint encoding for multi-layer PUSCH repetitions | | | |
|---|---|---|---|---|
| Value of RV field | First PUSCH RV, SRI bit field | Second PUSCH RV, SRI bit field | Third PUSCH RV, SRI bit field | Fourth PUSCH RV, SRI bit field |
| 0 | {0, i} | {0, i + 1} | {0, i + 2} | {0, i + 3} |
| 1 | {0, i} | {3, i} | {0, i + 1} | {3, i + 1} |
| 2 | {0, i} | {2, i} | {3, i} | {1, i} |
| 3 | {0, i} | {1, i + 2} | {2, i + 4} | {0, i + 6} |

For example, an index i may be given by an SRI field DCI. Based on $L_{max}$ and $N_{SRS}$, x in i+x may be read from the appropriate table and from the entries with the same transmission rank. For example, if $L_{max}$=2 and $N_{SRS}$=4, and an SRI bit field=4 maps to an SRI set={0,1} (e.g., according to Table 1), a value of RV=0 may indicate a mapping of the SRIs to a sequence of PUSCH repetitions as a set {{0,1}, {0,2},{0,3},{1,2}}. If K is larger than 4, or larger than the number of columns in Table 2, the mapping may cycle back.

In some examples, an SRS resource indicator may be configured using RRC signaling for uplink configured grant transmission (e.g., grant-free transmission, uplink transmission without a corresponding DCI). For repetition with uplink configured grant transmission, the UE 115-b may be configured with a set of SRIs to be assumed for each PUSCH transmission within the repetition bundle. In some examples, the configuration may be separately performed for different uplink configured grant configurations.

A second example of mapping SRS resources determined at 325 to the PUSCH repetitions of 330 may be applied to or considered in the context of a codebook based transmission mode. In some examples, support may be limited to two SRS resources (e.g., $N_{SRS}$=2), such that an SRI field is a single bit indicator (e.g., a 1-bit field) that indicates the SRS resource to apply to an uplink transmission. In some examples, an assumption may be that the UE 115-b maps each SRS resource to a respective panel (e.g., a respective physically distinct antenna of the UE 115-b). To apply uplink repetitions for transmit diversity gains, it may be beneficial to transmit PUSCH repetitions from different panels.

In various examples, it may or may not be beneficial to cycle TPMI under repetition configurations in the context of a codebook based transmission mode. For example, TPMI and rank may be jointly indicated by DCI, and from an SRS transmission (e.g., by the UE 115-b), the best TPMI should be known at the base station 105-b and signaled to the UE 115-b to be used for an uplink transmission. However, the best TPMI may be different for different panels. Moreover, to compensate for channel estimation, the base station 105-b may benefit from the UE 115-b transmitting using a best TPMI and a second best TPMI in an uplink transmission. In some examples, signaling different TPMIs may be associated with changing DCI size. One approach for such signaling may be to include an additional TPMI field, where the usage of this field may be dependent on an SRI field value.

In one example, SRI cycling with codebook based PUSCH repetition may be supported with a same 1-bit field, but the bit field interpretation may be extended or remapped (e.g., via RRC configuration). For example, a 1-bit indicator of 0 may be mapped to the resources indicated by a 2-bit indicator of 00, and a 1-bit indicator of 1 may be mapped to the resources indicated by a 2-bit indicator of 01. In another example, SRI cycling with codebook based PUSCH repetition may be supported by increasing a SRI field by one bit (e.g., to a 2-bit indicator) to signal one of the values of 00, 01, 10, or 11 to the UE 115-$b$. Under either approach, the UE 115-$b$ may take the repetition factor and cycles through the SRI values. For example, if K=4, and SRI is 01, then the PUSCHs repetitions may be transmitted according to an SRS resource sequence of {0,1,0,1}. In some examples, an indicator TPMI1 may be applied to the PUSCH repetitions corresponding to SRI=0, and an indicator TPMI2 may be applied to the PUSCH repetitions corresponding to SRI=1. If all SRIs are 0 or 1, the UE 115-$b$ may ignore the value of the other TPMI field.

Figure 4A:
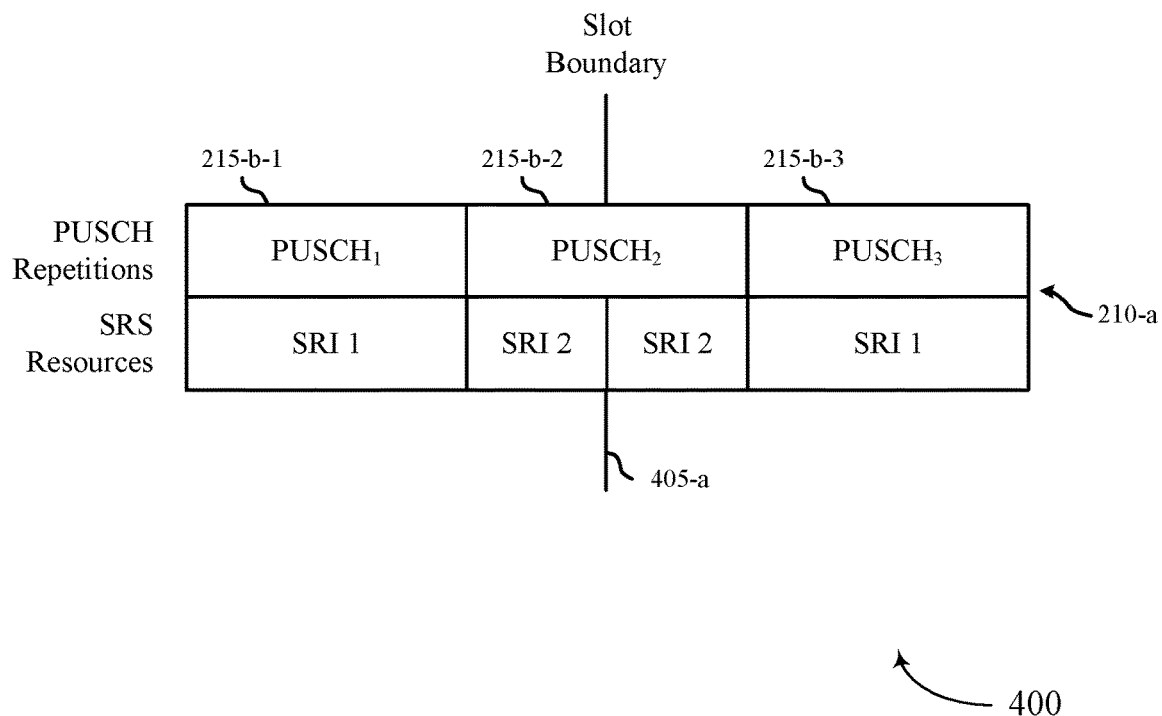
FIGS. 4A and 4B illustrate examples of SRS resource mapping that support uplink repetition configuration in accordance with aspects of the present disclosure.
Figure 4B:
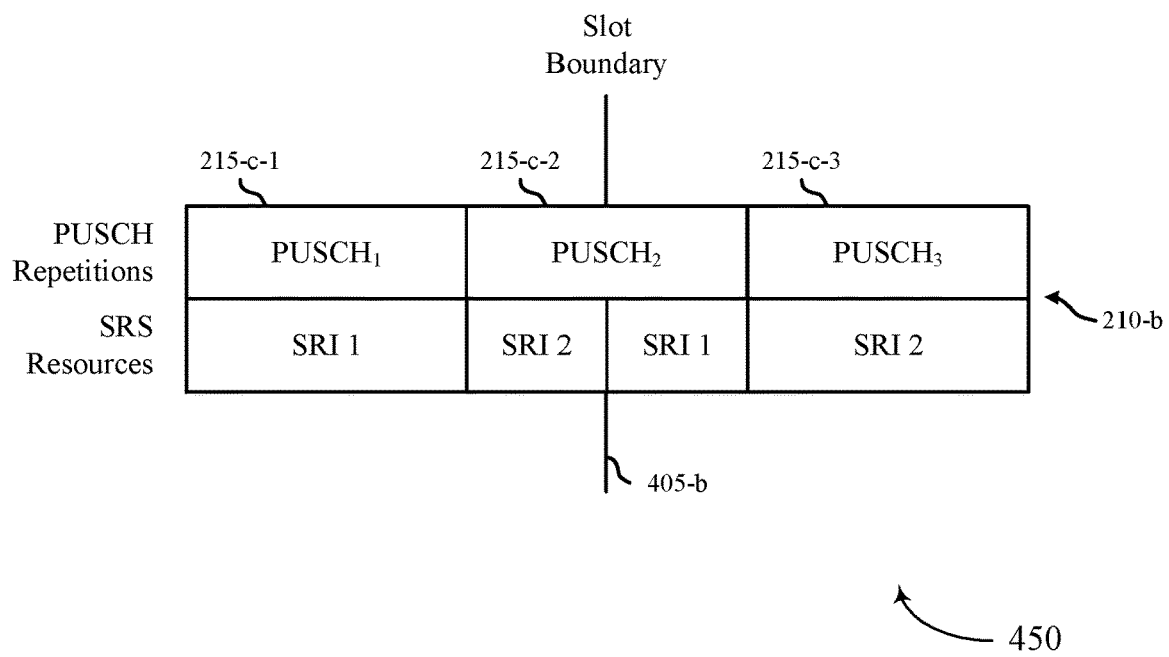

FIGS. 4A and 4B illustrate examples 400 and 450 of SRS resource mapping that support uplink repetition configuration in accordance with aspects of the present disclosure. The illustrated examples 400 and 450 may implement aspects of wireless communications systems 100, 200, or 300 described with reference to FIGS. 1, 2, and 3. In each of the example 400 and 450, an uplink transmission 210 may be scheduled such that one of the included PUSCH repetitions 215 overlaps a slot boundary 405, which may illustrate an example of a transmission boundary in the time domain. Both of the examples 400 and 450 may illustrate a cycling mapping of an SRS resource set {1,2}, and, in some examples, a base station 105 may configure a UE 115 to map an SRS resource set according to either the technique illustrated by example 400 or the technique illustrated by example 450 (e.g., via RRC signaling, via a downlink control message such as an uplink grant).

FIG. 4A illustrates a first example for SRS resource mapping across a slot boundary 405-$a$, where a PUSCH repetition 215-$b$-2 has a first portion that precedes the slot boundary 405-$a$ and a second portion that follows the slot boundary 405-$a$. In the example 400, a same SRS resource (e.g., corresponding to SRI=2) may be mapped to each portion of the PUSCH repetition 215-$b$-2. In other words, in the example 400, the slot boundary 405-$a$ may be ignored for the purposes of SRS resource mapping, such that PUSCH$_1$ is transmitted according to SRS resources corresponding to SRI=1, PUSCH$_2$ (e.g., in its entirety) is transmitted according to SRS resources corresponding to SRI=2, and PUSCH$_3$ is transmitted according to SRS resources corresponding to SRI=1.

FIG. 4B illustrates a second example for SRS resource mapping across a slot boundary 405-$b$, where a PUSCH repetition 215-$c$-2 has a first portion that precedes the slot boundary 405-$b$ and a second portion that follows the slot boundary 405-$b$. In the example 400, different SRS resources may be mapped to the different portions of the PUSCH repetition 215-$c$-2. For example, for the purposes of SRS resource mapping, the PUSCH repetition 215-$c$-2 may be interpreted as being two individual or effective PUSCH transmissions (e.g., PUSCH$_2$ and PUSCH$_2$'), each being separately mapped with a respective SRS resource. Accordingly, PUSCH$_1$ may be transmitted according to SRS resources corresponding to SRI=1, a first portion of PUSCH$_2$ may be transmitted according to SRS resources corresponding to SRI=2, a second portion of PUSCH$_2$ may be transmitted according to SRS resources corresponding to SRI=1, and PUSCH$_3$ $_{may}$ be transmitted according to SRS resources corresponding to SRI=2. Thus, although three complete PUSCH repetitions 215-$c$ are illustrated, which may correspond to a repetition indicator value of K=3, the effective number of repetitions may be four due to the crossing of the slot boundary 405-$b$. In the example 450, the described mapping techniques (e.g., cycling mapping, back-to-back mapping) may accordingly be configured and applied across the effective quantity of repetitions instead of the indicated quantity of repetitions.

In various examples, each SRI or corresponding SRS resource may be associated with respective open loop parameters. For example, as part of the PUSCH configuration, open loop parameters such as $P_0$ and $\alpha$ may be configured, and their values may also be indicated by an SRI field (e.g., an SRI field that collectively indicates beams, $P_0$, and $\alpha$). Accordingly, changing open loop power parameters across different PUSCH repetitions 215 may additionally or alternatively be supported by the described techniques.

Figure 5:
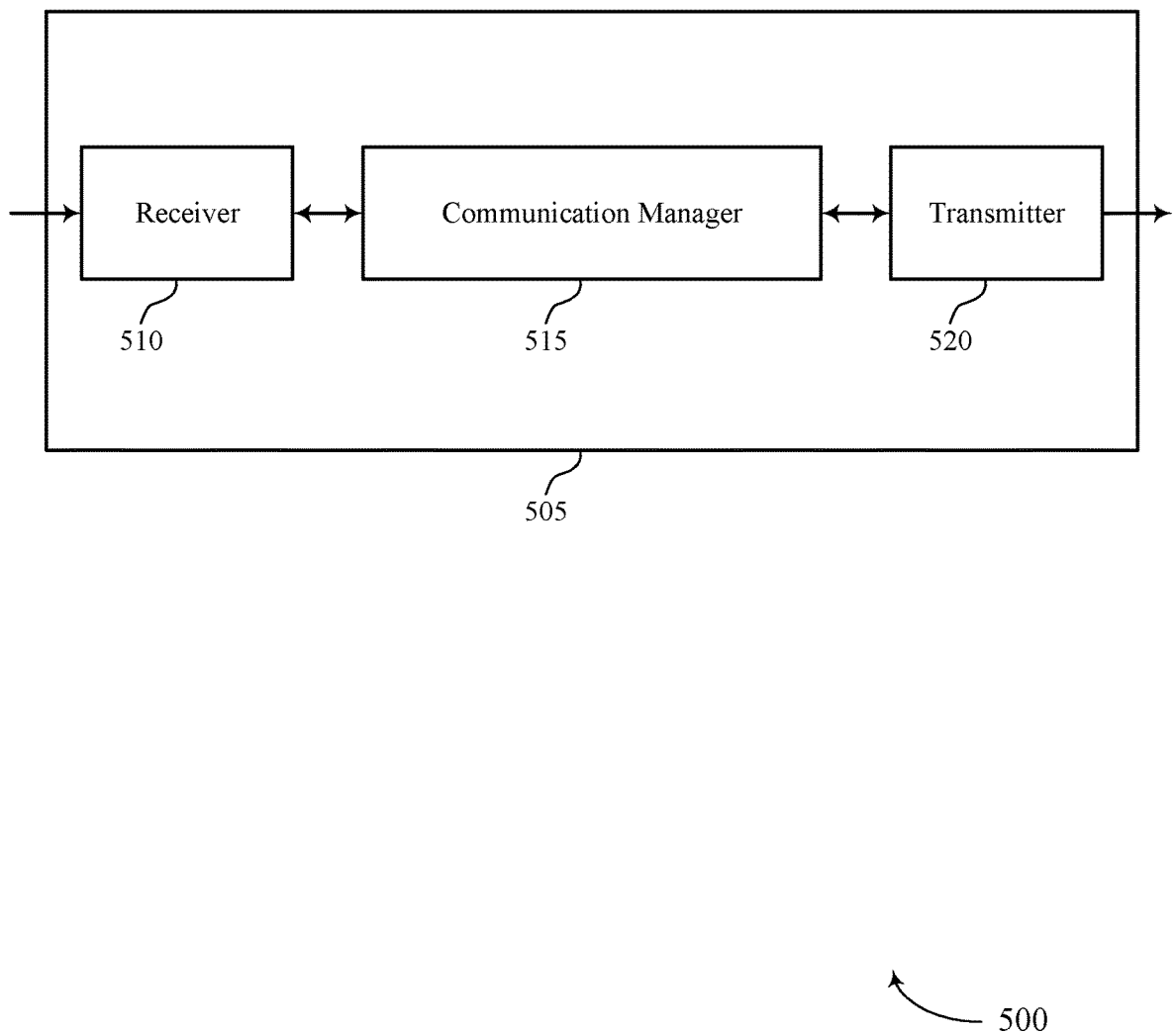
FIGS. 5 and 6 show block diagrams of devices that support uplink repetition configuration in accordance with aspects of the present disclosure.

FIG. 5 shows a block diagram 500 of a device 505 that supports uplink repetition configuration in accordance with aspects of the present disclosure. The device 505 may be an example of aspects of a UE 115 as described herein. The device 505 may include a receiver 510, a communication manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to uplink repetition configuration, etc.). Information may be passed on to other components of the device 505. The receiver 510 may be an example of aspects of the transceiver 815 described with reference to FIG. 8. The receiver 510 may utilize a single antenna or a set of antennas.

The transmitter 520 may transmit signals generated by other components of the device 505. In some examples, the transmitter 520 may be collocated with a receiver 510 in a transceiver module. For example, the transmitter 520 may be an example of aspects of the transceiver 815 described with reference to FIG. 8. The transmitter 520 may utilize a single antenna or a set of antennas.

The communication manager 515 may receive a downlink control message (e.g., downlink control information, a PDCCH, an uplink grant) that schedules resources for transmitting repetitions of an uplink channel transmission (e.g., PUSCH repetitions), identify from the downlink control message a sounding reference signal resource indicator (e.g., an SRI field indicating a set of one or more SRIs), determine a set of sounding reference signal resources based on the sounding reference signal resource indicator, and transmit the repetitions of the uplink channel transmission, where the transmitting includes transmitting a first of the repetitions according to a first sounding reference signal resource of the set of sounding reference signal resources and transmitting a second of the repetitions according to a second sounding reference signal resource of the set of sounding reference signal resources.

The communication manager 515, or its sub-components, may be implemented in hardware, code (e.g., software or firmware) executed by a processor, or any combination thereof. If implemented in code executed by a processor, the functions of the communication manager 515, or its subcomponents may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure. The communication manager 515 may be an example of aspects of the communication manager 810 described herein.

The communication manager 515, or its sub-components, may be physically located at various positions, including being distributed such that portions of functions are implemented at different physical locations by one or more physical components. In some examples, the communication manager 515, or its sub-components, may be a separate and distinct component in accordance with various aspects of the present disclosure. In some examples, the communication manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

By supporting various techniques for uplink repetition described herein, the communication manager 515 may improve uplink coverage of the device 505 by way of coverage enhancement and transmit diversity, which may support more reliable communications between the device 505 and a base station. In some examples, the described configurations for uplink repetition may enable such benefits with relatively limited downlink control signaling (e.g., corresponding to a particular uplink transmission or repetition window), such as a scheduling and mapping of PUSCH transmissions across multiple SRS resources based on a single instance of DCI, which may support an efficient utilization of communication resources.

Figure 6:
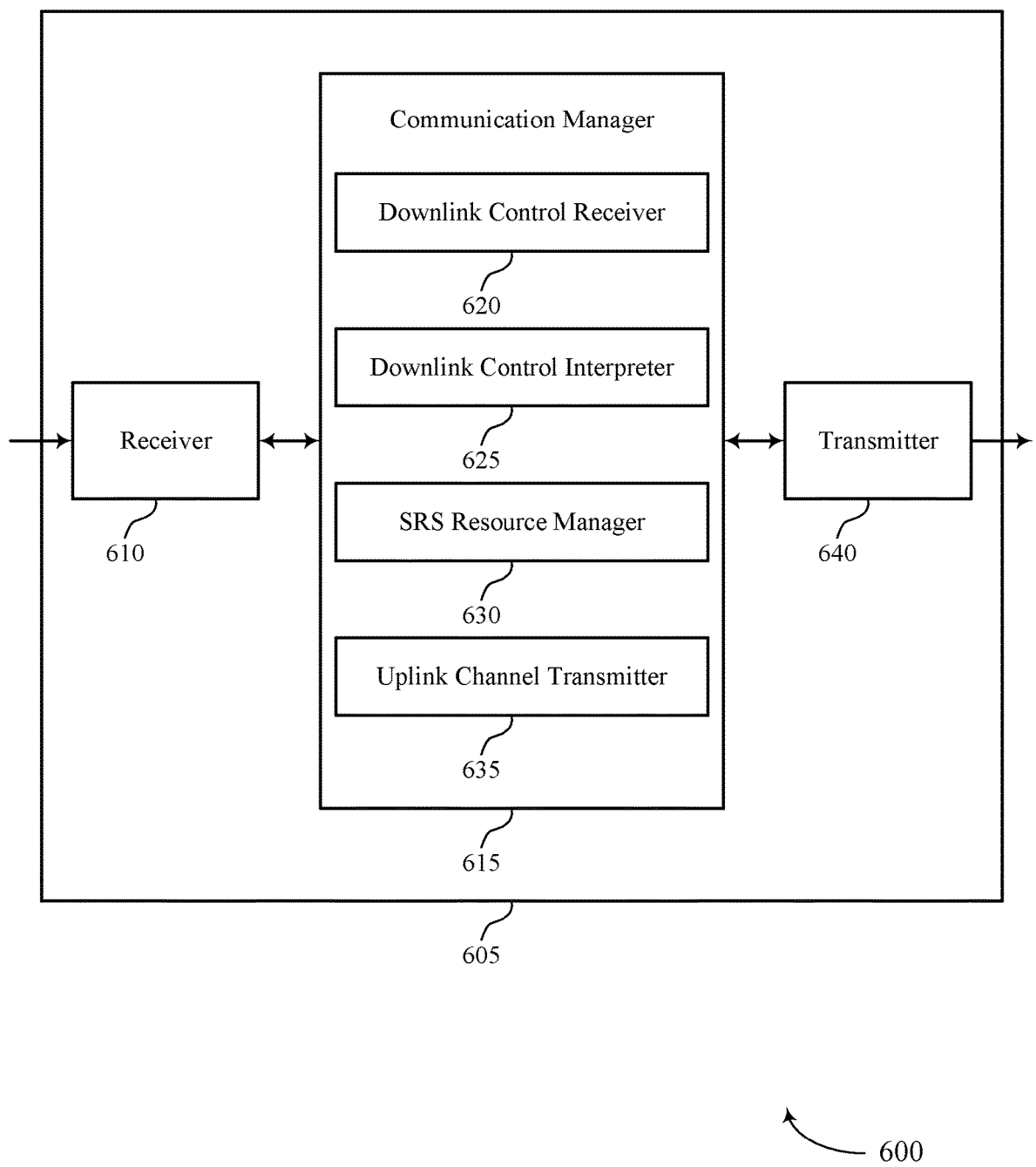

FIG. 6 shows a block diagram 600 of a device 605 that supports uplink repetition configuration in accordance with aspects of the present disclosure. The device 605 may be an example of aspects of a device 505, or a UE 115 as described herein. The device 605 may include a receiver 610, a communication manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to uplink repetition configuration, etc.). Information may be passed on to other components of the device 605. The receiver 610 may be an example of aspects of the transceiver 815 described with reference to FIG. 8. The receiver 610 may utilize a single antenna or a set of antennas.

The transmitter 640 may transmit signals generated by other components of the device 605. In some examples, the transmitter 640 may be collocated with a receiver 610 in a transceiver module. For example, the transmitter 640 may be an example of aspects of the transceiver 815 described with reference to FIG. 8. The transmitter 640 may utilize a single antenna or a set of antennas.

The communication manager 615 may be an example of aspects of the communication manager 515 as described herein. The communication manager 615 may include a downlink control receiver 620, a downlink control interpreter 625, an SRS resource manager 630, and an uplink channel transmitter 635. The communication manager 615 may be an example of aspects of the communication manager 810 described herein.

The downlink control receiver 620 may receive a downlink control message (e.g., downlink control information, a PDCCH, an uplink grant) that schedules resources for transmitting repetitions of an uplink channel transmission (e.g., PUSCH repetitions).

The downlink control interpreter 625 may identify from the downlink control message a sounding reference signal resource indicator (e.g., an SRI field indicating a set of one or more SRIs).

The SRS resource manager 630 may determine a set of sounding reference signal resources based on the sounding reference signal resource indicator.

The uplink channel transmitter 635 may transmit the repetitions of the uplink channel transmission, where the transmitting includes transmitting a first of the repetitions according to a first sounding reference signal resource of the set of sounding reference signal resources and transmitting a second of the repetitions according to a second sounding reference signal resource of the set of sounding reference signal resources.

Figure 7:
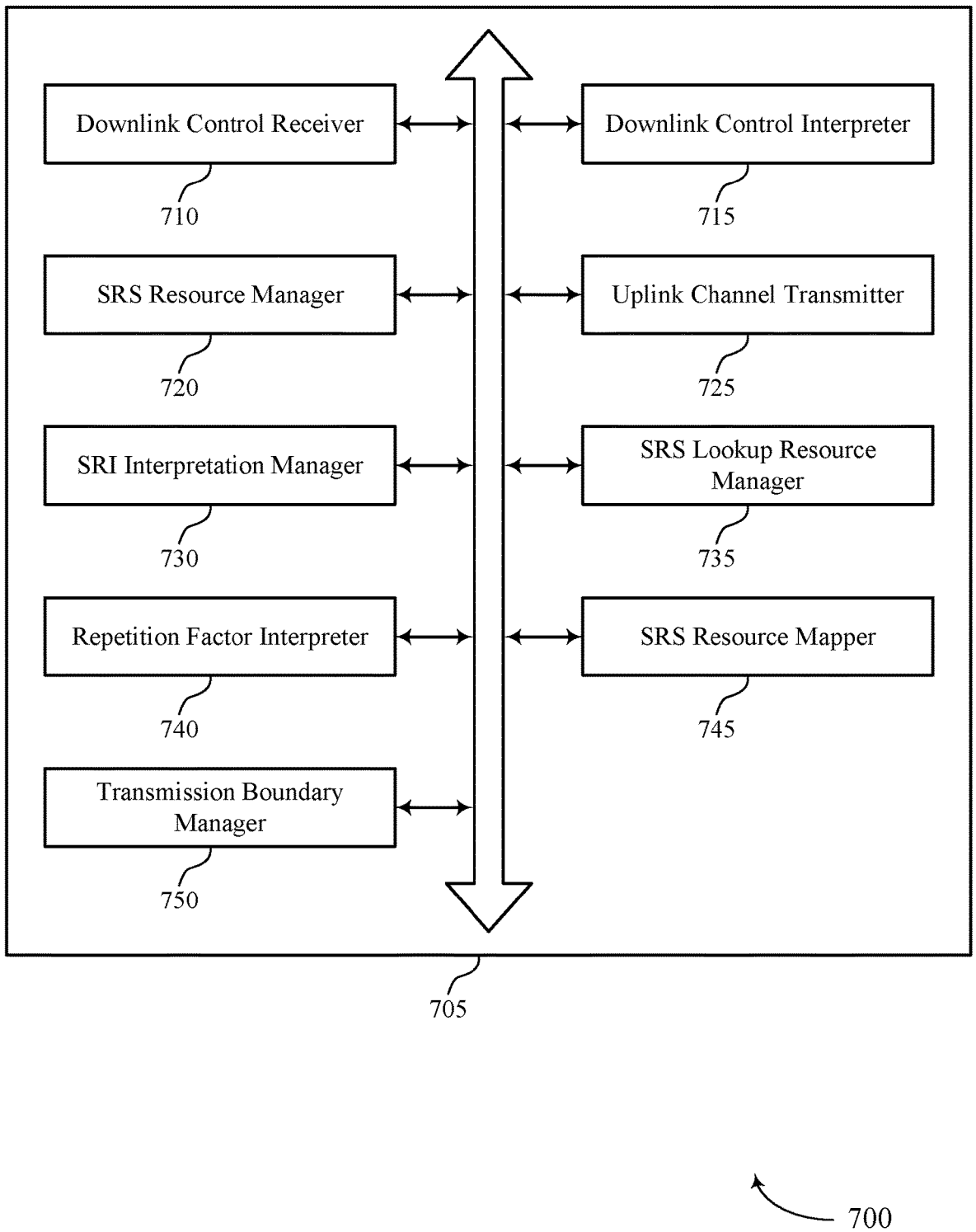
FIG. 7 shows a block diagram of a communication manager that supports uplink repetition configuration in accordance with aspects of the present disclosure.

FIG. 7 shows a block diagram 700 of a communication manager 705 that supports uplink repetition configuration in accordance with aspects of the present disclosure. The communication manager 705 may be an example of aspects of a communication manager 515, a communication manager 615, or a communication manager 810 described herein. The communication manager 705 may include a downlink control receiver 710, a downlink control interpreter 715, an SRS resource manager 720, an uplink channel transmitter 725, a SRI interpretation manager 730, an SRS lookup resource manager 735, a repetition factor interpreter 740, an SRS resource mapper 745, and a transmission boundary manager 750. Each of these modules may communicate, directly or indirectly, with one another (e.g., via one or more buses).

The downlink control receiver 710 may receive a downlink control message (e.g., downlink control information, a PDCCH, an uplink grant) that schedules resources for transmitting repetitions of an uplink channel transmission (e.g., PUSCH repetitions).

In some cases, the downlink control message includes downlink control information.

The downlink control interpreter 715 may identify from the downlink control message a sounding reference signal resource indicator (e.g., an SRI field indicating a set of one or more SRIs).

In some examples, the downlink control interpreter 715 may identify from the downlink control message a second sounding reference signal resource indicator (e.g., a second SRI).

In some examples, the downlink control interpreter 715 may identify from the downlink control message a redundancy version indicator.

The SRS resource manager 720 may determine a set of sounding reference signal resources based on the sounding reference signal resource indicator.

In some examples, the SRS resource manager 720 may determine a second set of sounding reference signal resources based on the sounding reference signal resource indicator.

In some examples, determining the set of sounding reference signal resources is based on the sounding reference signal resource indicator and the received configuration.

The uplink channel transmitter 725 may transmit the repetitions of the uplink channel transmission, where the transmitting includes transmitting a first of the repetitions according to a first sounding reference signal resource of the set of sounding reference signal resources and transmitting a second of the repetitions according to a second sounding reference signal resource of the set of sounding reference signal resources.

In some examples, transmitting the first of the repetitions includes transmitting over a first set of spatial layers and transmitting the third of the repetitions includes transmitting over a second set of spatial layers.

In some cases, the uplink channel transmission includes a single transport block (e.g., where the single transport block is repeated in each of the uplink channel transmission repetitions).

The SRI interpretation manager 730 may receive a configuration (e.g., an RRC configuration, a DCI indication, separately from the downlink control message) configuring the UE to interpret sounding reference signal resource indicators for uplink transmission repetitions (e.g., configuring the UE to interpret an SRI field as indicating SRS resources to be mapped to different PUSCH repetitions in the time domain, rather than interpreting an SRI field as indicating SRS resources that are to be combined for a single MIMO transmission in the time domain).

In some examples, the SRI interpretation manager 730 may receive a configuration (e.g., an RRC configuration) for mapping single-bit sounding reference signal resource indicators to sounding reference signal resources indicated by two-bit sounding reference signal resource indicators.

In some cases, the UE is configured for codebook-based uplink communication and the sounding reference signal resource indicator includes a two bit indication.

The SRS lookup resource manager 735 may identify a non-codebook sounding reference signal resource indicator table based on a maximum quantity of spatial layers supported by the UE (e.g., $L_{max}$).

In some examples, the SRS lookup resource manager 735 may identify a field of the non-codebook sounding reference signal resource indicator table based on a quantity of configured sounding reference signal resources (e.g., $N_{SRS}$) and the sounding reference signal resource indicator, where the field indicates the set of sounding reference signal resources.

The repetition factor interpreter 740 may receive an indication of a repetition factor (e.g., K), the repetition factor corresponding to a quantity of repetitions of the uplink channel transmission.

In some examples, the repetition factor interpreter 740 may interpret the repetition factor to indicate a respective quantity of repetitions of the uplink channel transmission for different ones of the set of sounding reference signal resources.

In some examples, the repetition factor interpreter 740 may interpret the repetition factor to indicate a total quantity of repetitions of the uplink channel transmission.

In some examples, the repetition factor interpreter 740 may identify that the repetition factor exceeds the quantity of sounding reference signal resources in the determined set of sounding reference signal resources, and the uplink channel transmitter 725 may transmit at least two of the repetitions of the uplink channel transmission with a same one of the set of sounding reference signal resources.

The SRS resource mapper 745 may map (e.g., according to a cyclic mapping approach) each of the set of sounding reference signal resources to a respective one of the repetitions of the uplink channel transmission in a first sub-sequence of the repetitions of the uplink channel transmission, and map at least one of the set of sounding reference signal resources to a respective one of the repetitions of the uplink channel transmission in a second sub-sequence of the repetitions of the uplink channel transmission.

In some examples, the SRS resource mapper 745 may map (e.g., according to a back-to-back approach) a first of the set of sounding reference signal resources to at least two of the repetitions of the uplink channel transmission in a first sub-sequence of the repetitions of the uplink channel transmission, and map a second of the set of sounding reference signal resources to at least two of the repetitions of the uplink channel transmission in a second sub-sequence of the repetitions of the uplink channel transmission.

In some examples, the SRS resource mapper 745 may receive control signaling (e.g., DCI, a PDCCH transmission) indicating a configuration for mapping sounding reference signal resources to the repetitions of the uplink channel transmission.

In some examples, the SRS resource mapper 745 may map a portion of the one of the repetitions of the uplink channel transmission that precedes the slot boundary to a first of the set of sounding reference signal resources, and map a portion of the one of the repetitions of the uplink channel transmission that follows the slot boundary to a second of the set of sounding reference signal resources.

In some examples, the SRS resource mapper 745 may map the first of the repetitions to at least two of (e.g., each of) the set of sounding reference signal resources (e.g., for a transmission of the first of the repetitions according to multiple beams, multiple spatial layers, or an effective beam or layer resulting from the combination of the at least two of the set of SRS resources).

In some examples, the SRS resource mapper 745 may map the second of the repetitions to at least two of (e.g., each of) the set of sounding reference signal resources.

In some examples, the SRS resource mapper 745 may map a third of the repetitions to at least two of (e.g., each of) the second set of sounding reference signal resources.

In some examples, the SRS resource mapper 745 may map the repetitions of the uplink channel transmission to the set of sounding reference signal resources based on jointly decoding the sounding reference signal resource indicator and the redundancy version indicator.

In some examples, the SRS resource mapper 745 may map a first transmit precoding matrix (e.g., TPMI) to a first of the set of sounding reference signal resources, and map a second transmit precoding matrix to a second of the set of sounding reference signal resources.

In some examples, the SRS resource mapper 745 may map each of the repetitions of the uplink channel transmission to different resources in the time domain (e.g., time domain resources of an uplink grant or otherwise configured resources in the time domain, where each of the repetitions of the uplink channel transmission are non-overlapping in the time domain).

In some examples, the SRS resource mapper 745 may map each of the repetitions of the uplink channel transmission to the same resources in the frequency domain (e.g., frequency domain resources of an uplink grant or otherwise configured resources in the frequency domain, where each of the repetitions of the uplink channel transmission use the same frequency resources, the same carrier, the same sub-carrier, the same bandwidth part).

The transmission boundary manager 750 may identify that one of the repetitions of the uplink channel transmission overlaps a transmission boundary (e.g., a slot boundary) in the time domain.

Figure 8:
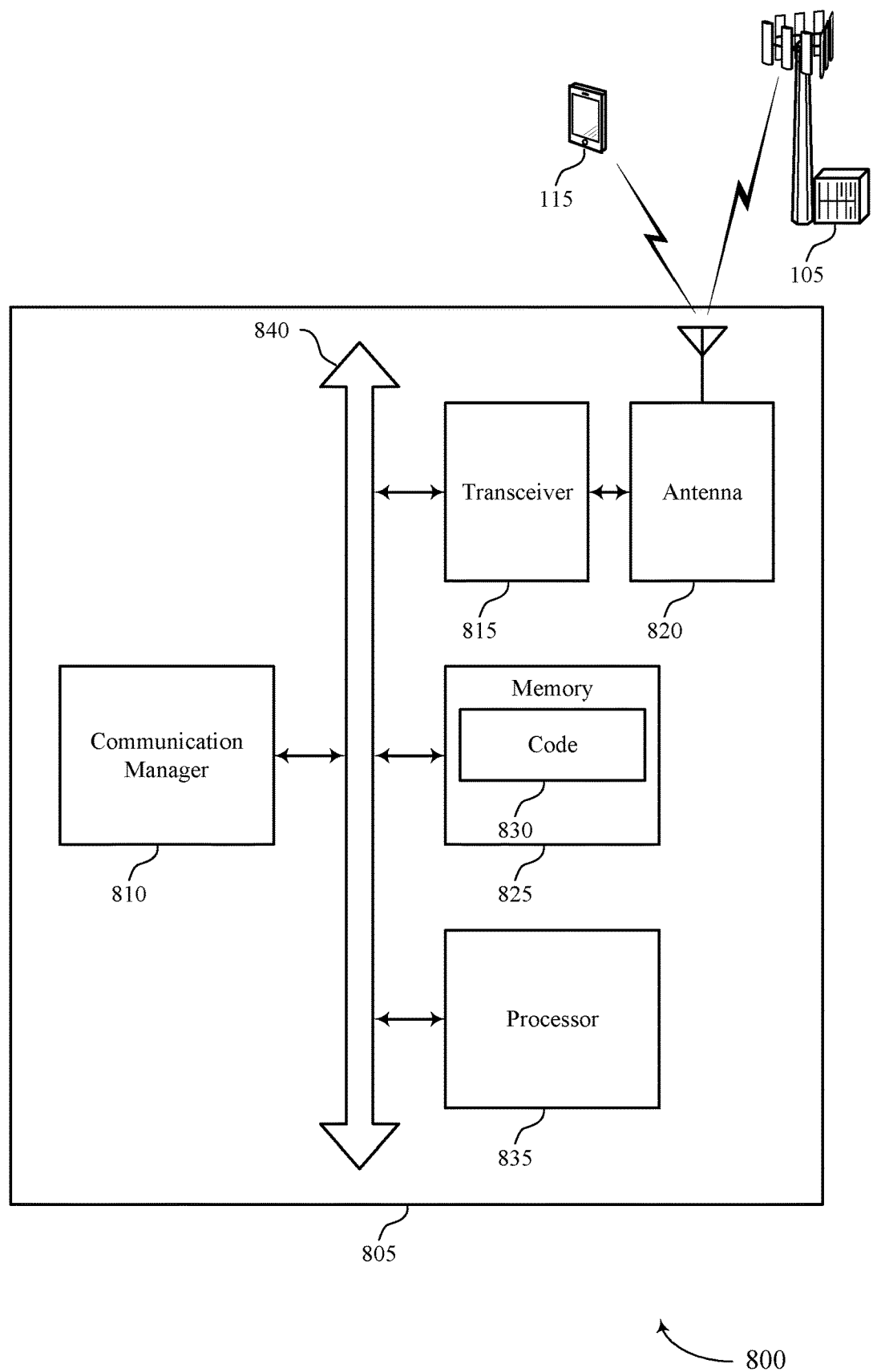
FIG. 8 shows a diagram of a system including a device that supports uplink repetition configuration in accordance with aspects of the present disclosure.

FIG. 8 shows a diagram of a system 800 including a device 805 that supports uplink repetition configuration in accordance with aspects of the present disclosure. The device 805 may be an example of or include the components of device 505, device 605, or a UE 115 as described herein. The device 805 may include components for bi-directional voice and data communications including components for transmitting and receiving communications, including a communication manager 810, a transceiver 815, an antenna 820, memory 825, and a processor 835. These components may be in electronic communication via one or more buses (e.g., bus 840).

The communication manager 810 may receive a downlink control message (e.g., downlink control information, a PDCCH, an uplink grant) that schedules resources for transmitting repetitions of an uplink channel transmission (e.g., PUSCH repetitions), identify from the downlink control message a sounding reference signal resource indicator (e.g., an SRI field indicating a set of one or more SRIs), determine a set of sounding reference signal resources based on the sounding reference signal resource indicator, and transmit the repetitions of the uplink channel transmission, where the transmitting includes transmitting a first of the repetitions according to a first sounding reference signal resource of the set of sounding reference signal resources and transmitting a second of the repetitions according to a second sounding reference signal resource of the set of sounding reference signal resources.

The transceiver 815 may communicate bi-directionally, via one or more antennas, wired, or wireless links as described herein. For example, the transceiver 815 may represent a wireless transceiver and may communicate bi-directionally with another wireless transceiver. The transceiver 815 may also include a modem to modulate the packets and provide the modulated packets to the antennas for transmission, and to demodulate packets received from the antennas.

In some cases, the wireless device may include a single antenna 820. However, in some cases the device may have more than one antenna 820, which may be capable of concurrently transmitting or receiving multiple wireless transmissions.

The memory 825 may include RAM and ROM. The memory 825 may store computer-readable, computer-executable code 830 including instructions that, when executed, cause the processor to perform various functions described herein. In some cases, the memory 825 may contain, among other things, a basic input/output system (BIOS) which may control basic hardware or software operation such as the interaction with peripheral components or devices.

The code 830 may include instructions to implement aspects of the present disclosure, including instructions to support wireless communications. The code 830 may be stored in a non-transitory computer-readable medium such as system memory or other type of memory. In some cases, the code 830 may not be directly executable by the processor 835 but may cause a computer (e.g., when compiled and executed) to perform functions described herein.

The processor 835 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 835 may be configured to operate a memory array using a memory controller. In other cases, a memory controller may be integrated into the processor 835. The processor 835 may be configured to execute computer-readable instructions stored in a memory (e.g., the memory 825) to cause the device 805 to perform various functions (e.g., functions or tasks supporting uplink repetition configuration).

By configuring the device 805 to support the described techniques for uplink repetition (e.g., using the communication manager 810), the device 805 may benefit from improved uplink coverage by way of coverage enhancement and transmit diversity, which may support more reliable communications between the device 805 and a base station. In some examples, the described configurations for uplink repetition may enable such benefits with relatively limited downlink control signaling (e.g., corresponding to a particular uplink transmission or repetition window), such as a scheduling and mapping of PUSCH transmissions across multiple SRS resources based on a single instance of DCI, which may support an efficient utilization of communication resources.

Figure 9:
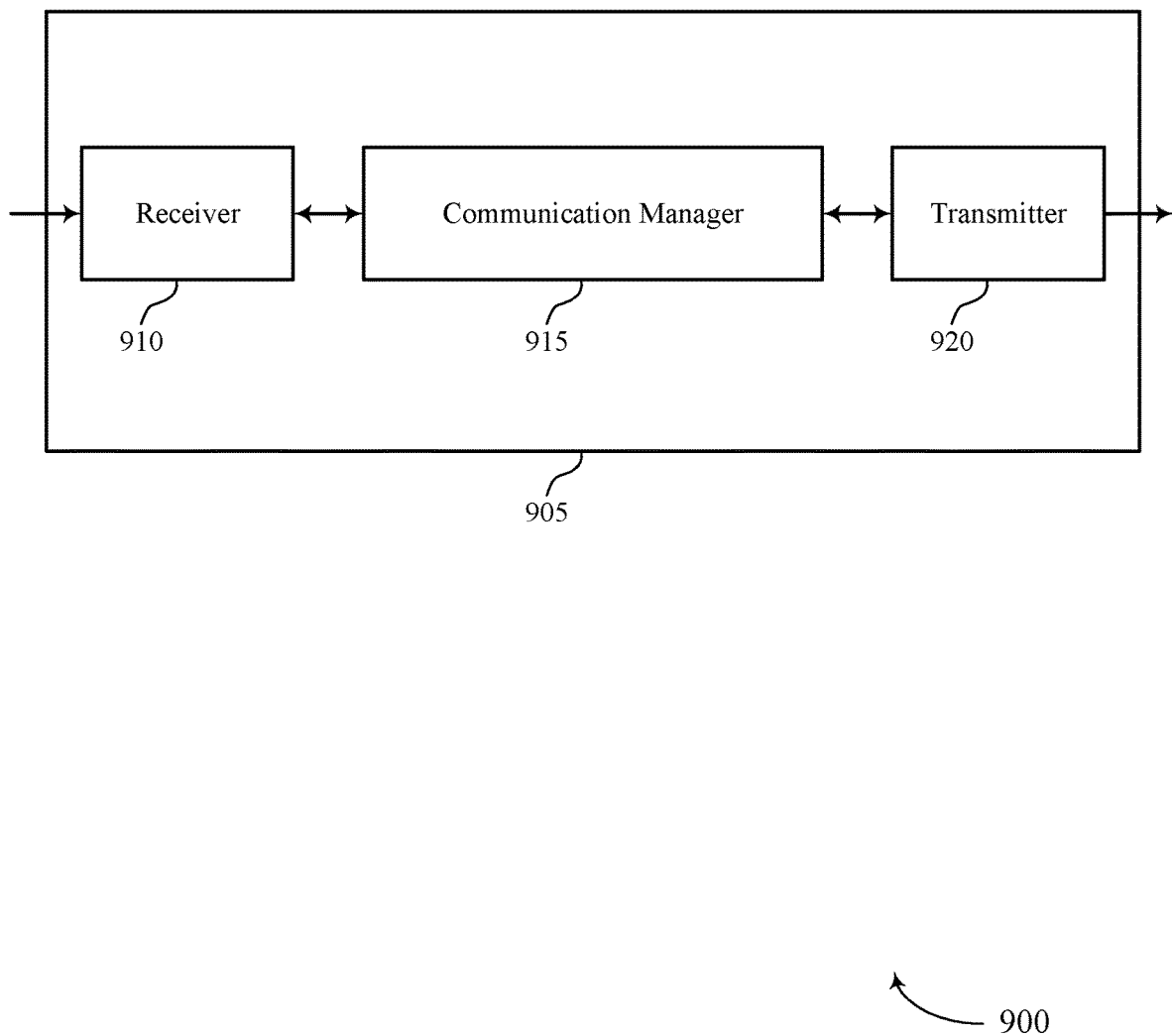
FIGS. 9 and 10 show block diagrams of devices that support uplink repetition configuration in accordance with aspects of the present disclosure.

FIG. 9 shows a block diagram 900 of a device 905 that supports uplink repetition configuration in accordance with aspects of the present disclosure. The device 905 may be an example of aspects of a base station 105 as described herein. The device 905 may include a receiver 910, a communication manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to uplink repetition configuration, etc.). Information may be passed on to other components of the device 905. The receiver 910 may be an example of aspects of the transceiver 1220 described with reference to FIG. 12. The receiver 910 may utilize a single antenna or a set of antennas.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

The communication manager 915 may transmit, to a UE, a downlink control message (e.g., downlink control information, a PDCCH, an uplink grant) that schedules resources for transmitting repetitions of an uplink channel transmission, where the downlink control message includes a sounding reference signal resource indicator (e.g., an SRI) and receive the repetitions of the uplink channel transmission from the UE according to a set of sounding reference signal resources indicated by the sounding reference signal resource indicator, where the receiving includes receiving a first of the repetitions according to a first of the set of sounding reference signal resources and receiving a second of the repetitions according to a second of the set of sounding reference signal resources. The communication manager 915 may be an example of aspects of the communication manager 1210 described herein.

The communication manager 915, or its sub-components, may be implemented in hardware, code (e.g., software or firmware) executed by a processor, or any combination thereof. If implemented in code executed by a processor, the functions of the communication manager 915, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communication manager 915, or its sub-components, may be physically located at various positions, including being distributed such that portions of functions are implemented at different physical locations by one or more physical components. In some examples, the communication manager 915, or its sub-components, may be a separate and distinct component in accordance with various aspects of the present disclosure. In some examples, the communication manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

By supporting various techniques for uplink repetition described herein, the communication manager 915 may improve uplink coverage for supported UEs by way of coverage enhancement and transmit diversity, which may support more reliable communications between the device 905 and the supported UEs. In some examples, the described configurations for uplink repetition may enable such benefits with relatively limited downlink control signaling (e.g., corresponding to a particular uplink transmission or repetition window), such as a scheduling and mapping of PUSCH transmissions across multiple SRS resources based on a single instance of DCI, which may support an efficient utilization of communication resources.

Figure 10:
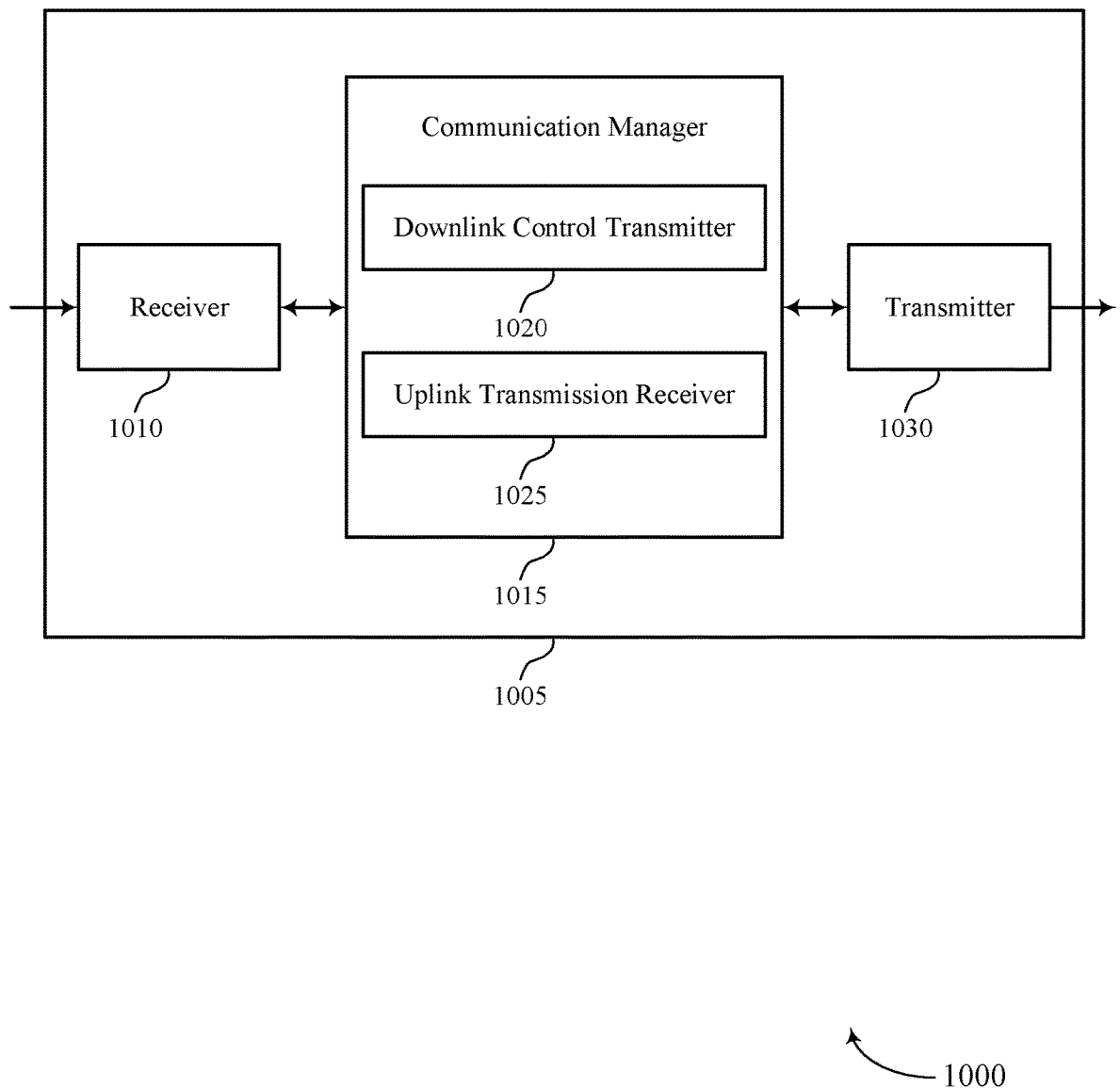

FIG. 10 shows a block diagram 1000 of a device 1005 that supports uplink repetition configuration in accordance with aspects of the present disclosure. The device 1005 may be an example of aspects of a device 905, or a base station 105 as described herein. The device 1005 may include a receiver 1010, a communication manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink repetition configuration, etc.). Information may be passed on to other components of the device 1005. The receiver 1010 may be an example of aspects of the transceiver 1220 described with reference to FIG. 12. The receiver 1010 may utilize a single antenna or a set of antennas.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

The communication manager 1015 may be an example of aspects of the communication manager 915 as described herein. The communication manager 1015 may include a downlink control transmitter 1020 and an uplink transmission receiver 1025. The communication manager 1015 may be an example of aspects of the communication manager 1210 described herein.

The downlink control transmitter 1020 may transmit, to a UE, a downlink control message (e.g., downlink control information, a PDCCH, an uplink grant) that schedules resources for transmitting repetitions of an uplink channel transmission, where the downlink control message includes a sounding reference signal resource indicator (e.g., an SRI).

The uplink transmission receiver 1025 may receive the repetitions of the uplink channel transmission from the UE according to a set of sounding reference signal resources indicated by the sounding reference signal resource indicator, where the receiving includes receiving a first of the repetitions according to a first of the set of sounding reference signal resources and receiving a second of the repetitions according to a second of the set of sounding reference signal resources.

Figure 11:
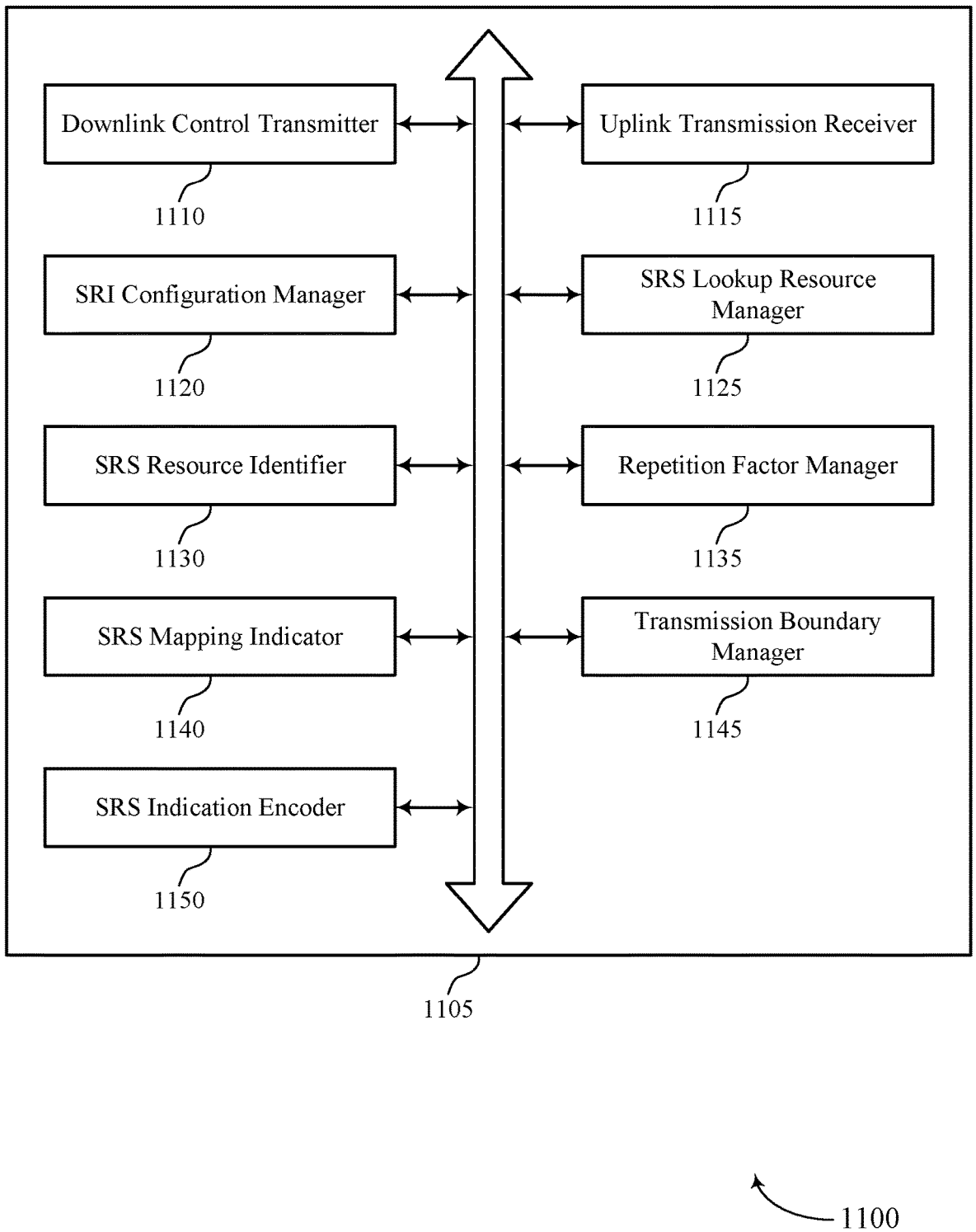
FIG. 11 shows a block diagram of a communication manager that supports uplink repetition configuration in accordance with aspects of the present disclosure.

FIG. 11 shows a block diagram 1100 of a communication manager 1105 that supports uplink repetition configuration in accordance with aspects of the present disclosure. The communication manager 1105 may be an example of aspects of a communication manager 915, a communication manager 1015, or a communication manager 1210 described herein. The communication manager 1105 may include a downlink control transmitter 1110, an uplink transmission receiver 1115, a SRI configuration manager 1120, an SRS lookup resource manager 1125, an SRS resource identifier 1130, a repetition factor manager 1135, an SRS mapping indicator 1140, a transmission boundary manager 1145, and an SRS indication encoder 1150. Each of these modules may communicate, directly or indirectly, with one another (e.g., via one or more buses).

The downlink control transmitter 1110 may transmit, to a UE, a downlink control message (e.g., downlink control information, a PDCCH) that schedules resources for transmitting repetitions of an uplink channel transmission, where the downlink control message includes a sounding reference signal resource indicator (e.g., an SRI).

In some cases, the downlink control message includes downlink control information.

The uplink transmission receiver 1115 may receive the repetitions of the uplink channel transmission from the UE according to a set of sounding reference signal resources indicated by the sounding reference signal resource indicator, where the receiving includes receiving a first of the repetitions according to a first of the set of sounding reference signal resources and receiving a second of the repetitions according to a second of the set of sounding reference signal resources.

In some examples, the uplink transmission receiver 1115 may receive (e.g., according to a cyclic mapping) a respective repetition of the uplink channel transmission in a first sub-sequence of the repetitions of the uplink channel transmission according to each of the set of sounding reference signal resources, and receive a respective repetition of the uplink channel transmission in a second sub-sequence of the repetitions of the uplink channel transmission according to at least one of the set of sounding reference signal resources.

In some examples, the uplink transmission receiver 1115 may receive (e.g., according to a back-to-back mapping) at least two repetitions of the uplink channel transmission in a first sub-sequence of the repetitions of the uplink channel transmission according to a first of the set of sounding reference signal resources, and receive at least two repetitions of the uplink channel transmission in a second sub-sequence of the repetitions of the uplink channel transmission according to a second of the set of sounding reference signal resources.

In some examples, the uplink transmission receiver 1115 may receive a portion of the one of the repetitions of the uplink channel transmission that precedes the slot boundary over a first of the set of sounding reference signal resources, and receive a portion of the one of the repetitions of the uplink channel transmission that follows the slot boundary over a second of the set of sounding reference signal resources.

In some examples, the uplink transmission receiver 1115 may receive the first of the repetitions over at least two of (e.g., each of) the set of sounding reference signal resources (e.g., for reception of the first of the repetitions according to multiple transmit beams, multiple spatial layers, or an effective transmit beam or layer resulting from the combination of the at least two of the set of SRS resources), and receive the second of the repetitions over at least two of (e.g., each of) the set of sounding reference signal resources.

In some examples, the uplink transmission receiver 1115 may receive a third of the repetitions over at least two of (e.g., each of) the second set of sounding reference signal resources.

In some examples, receiving the first of the repetitions includes receiving over a first set of spatial layers and receiving the third of the repetitions includes receiving over a second set of spatial layers.

In some examples, the uplink transmission receiver 1115 may receive each of the repetitions of the uplink channel transmission over different resources in the time domain (e.g., where, as scheduled by the base station or otherwise configured, each of the repetitions of the uplink channel transmission are configured to be non-overlapping in the time domain).

In some examples, the uplink transmission receiver 1115 may receive each of the repetitions of the uplink channel transmission over the same resources in the frequency domain (e.g., where, as scheduled by the base station, each of the repetitions of the uplink channel transmission are configured to use the same frequency resources, the same carrier, the same subcarrier, the same bandwidth part).

In some cases, the uplink channel transmission includes a single transport block (e.g., where the single transport block is repeated in each of the uplink channel transmission repetitions).

The SRI configuration manager 1120 may transmit a configuration (e.g., an RRC configuration, a DCI indication, separately from the downlink control message) configuring the UE to interpret sounding reference signal resource indicators for uplink transmission repetitions (e.g., configuring the UE to interpret an SRI field as indicating SRS resources to be mapped to different PUSCH repetitions in the time domain, rather than interpreting an SRI field as indicating SRS resources that are to be combined for a single MIMO transmission in the time domain).

In some cases, the UE is configured for codebook-based uplink communication and the sounding reference signal resource indicator includes a two bit indication.

The SRS lookup resource manager 1125 may identify a non-codebook sounding reference signal resource indicator table based on a maximum quantity of spatial layers supported by the UE (e.g., $L_{max}$).

The SRS resource identifier 1130 may select a field of the non-codebook sounding reference signal resource indicator table based on a quantity of configured sounding reference signal resources (e.g., $N_{SRS}$) and a set of sounding reference signal resources.

In some examples, the SRS resource identifier 1130 may determine the sounding reference signal resource indicator based on the selected field.

The repetition factor manager 1135 may transmit an indication of a repetition factor (e.g., K), the repetition factor corresponding to a quantity of repetitions of the uplink channel transmission.

In some examples, the repetition factor manager 1135 may configure the UE to interpret the repetition factor as indicating a respective quantity of repetitions of the uplink channel transmission for different ones of a set of sounding reference signal resources.

In some examples, the repetition factor manager 1135 may configure the UE to interpret the repetition factor to indicate a total quantity of repetitions of the uplink channel transmission.

The SRS mapping indicator 1140 may transmit control signaling (e.g., DCI, a PDCCH transmission) indicating a configuration for mapping sounding reference signal resources to the repetitions of the uplink channel transmission.

In some examples, the SRS mapping indicator 1140 may transmit a configuration (e.g., an RRC configuration) for mapping single-bit sounding reference signal resource indicators to sounding reference signal resources indicated by two-bit sounding reference signal resource indicators.

In some examples, the SRS mapping indicator 1140 may indicate the set of sounding reference signal resources based on the sounding reference signal resource indicator and the transmitted configuration.

In some examples, the SRS mapping indicator 1140 may map a first transmit precoding matrix (e.g., TPMI) to a first of the set of sounding reference signal resources.

In some examples, the SRS mapping indicator 1140 may map a second transmit precoding matrix to a second of the set of sounding reference signal resources.

The transmission boundary manager 1145 may identify that one of the repetitions of the uplink channel transmission overlaps a transmission boundary (e.g., a slot boundary) in the time domain.

The SRS indication encoder 1150 may jointly encode the sounding reference signal resource indicator and the redundancy version indicator, and the uplink transmission receiver 1115 may receive the repetitions of the uplink channel transmission over the set of sounding reference signal resources based on the joint encoding.

In some cases, the downlink control message includes a redundancy version indicator.

Figure 12:
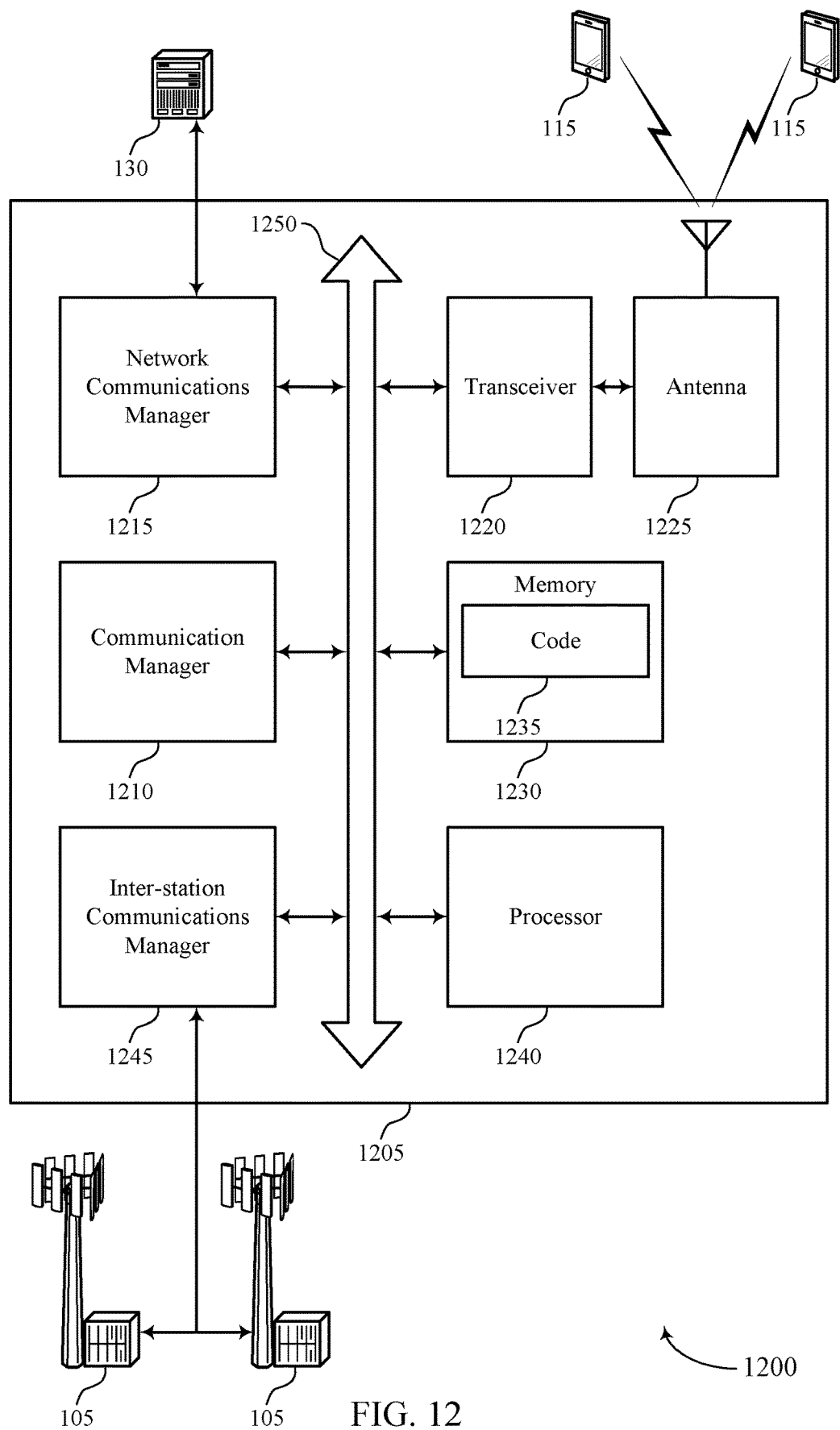
FIG. 12 shows a diagram of a system including a device that supports uplink repetition configuration in accordance with aspects of the present disclosure.

FIG. 12 shows a diagram of a system 1200 including a device 1205 that supports uplink repetition configuration in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communication manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communication manager 1210 may transmit, to a UE, a downlink control message (e.g., downlink control information, a PDCCH, an uplink grant) that schedules resources for transmitting repetitions of an uplink channel transmission, where the downlink control message includes a sounding reference signal resource indicator (e.g., an SRI) and receive the repetitions of the uplink channel transmission from the UE according to a set of sounding reference signal resources indicated by the sounding reference signal resource indicator, where the receiving includes receiving a first of the repetitions according to a first of the set of sounding reference signal resources and receiving a second of the repetitions according to a second of the set of sounding reference signal resources.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting uplink repetition configuration).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

By configuring the device 1205 to support the described techniques for uplink repetition (e.g., using the communication manager 1210), the device 1205 may benefit from improved uplink coverage by way of coverage enhancement and transmit diversity, which may support more reliable communications between the device 1205 and supported UEs. In some examples, the described configurations for uplink repetition may enable such benefits with relatively limited downlink control signaling (e.g., corresponding to a particular uplink transmission or repetition window), such as a scheduling and mapping of PUSCH transmissions across multiple SRS resources based on a single instance of DCI, which may support an efficient utilization of communication resources.

Figure 13:
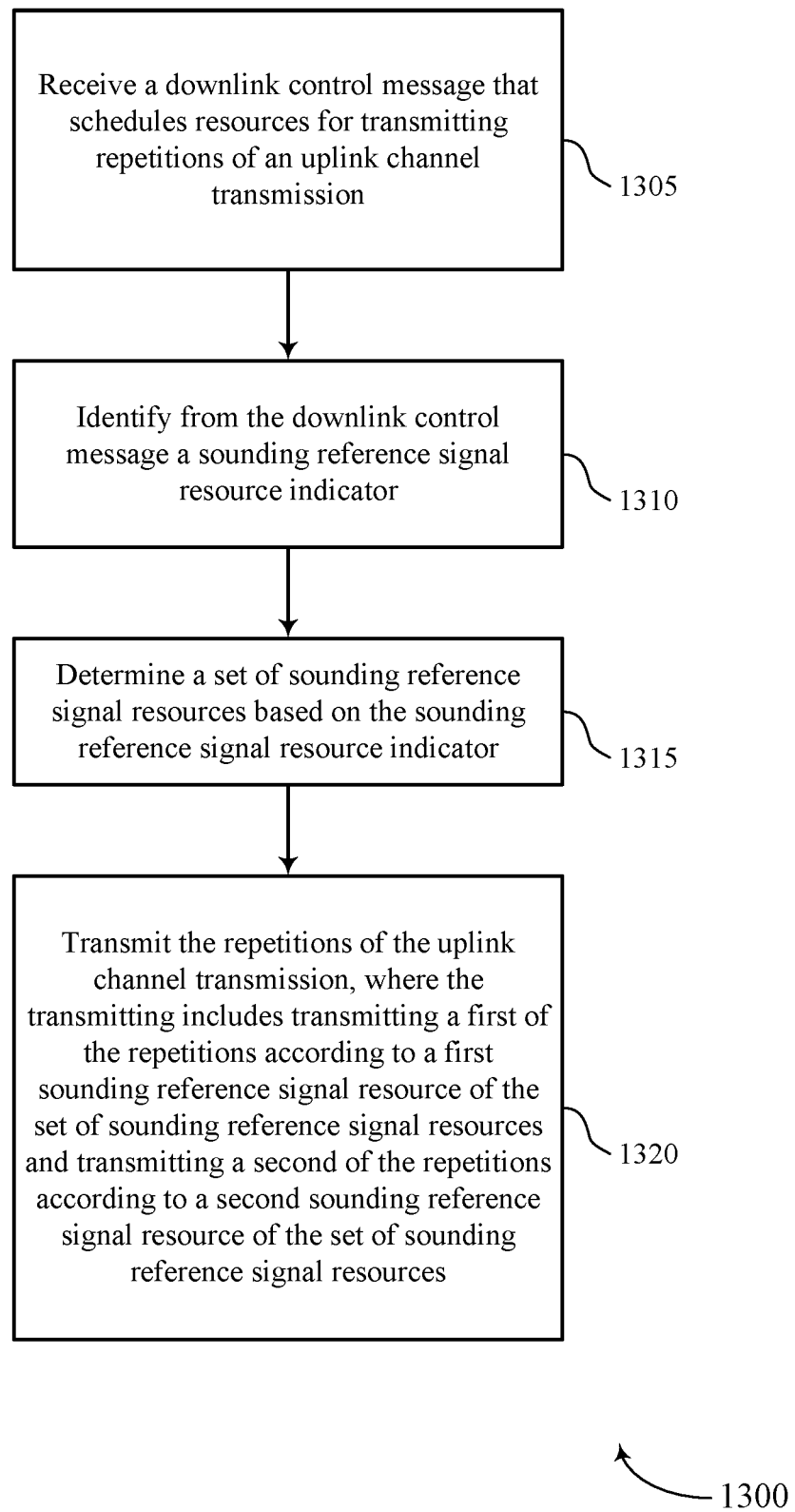
FIGS. 13 through 16 show flowcharts illustrating methods that support uplink repetition configuration in accordance with aspects of the present disclosure.

FIG. 13 shows a flowchart illustrating a method 1300 that supports uplink repetition configuration in accordance with aspects of the present disclosure. The operations of method 1300 may be implemented by a UE 115 or its components as described herein. For example, the operations of method 1300 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1305, the UE may receive a downlink control message (e.g., downlink control information, a PDCCH, an uplink grant) that schedules resources for transmitting repetitions of an uplink channel transmission (e.g., PUSCH repetitions). The operations of 1305 may be performed according to the methods described herein. In some examples, aspects of the operations of 1305 may be performed by a downlink control receiver as described with reference to FIGS. 5 through 8.

At 1310, the UE may identify from the downlink control message a sounding reference signal resource indicator (e.g., an SRI field indicating a set of one or more SRIs). The operations of 1310 may be performed according to the methods described herein. In some examples, aspects of the operations of 1310 may be performed by a downlink control interpreter as described with reference to FIGS. 5 through 8.

At 1315, the UE may determine a set of sounding reference signal resources based on the sounding reference signal resource indicator. The operations of 1315 may be performed according to the methods described herein. In some examples, aspects of the operations of 1315 may be performed by an SRS resource manager as described with reference to FIGS. 5 through 8.

At 1320, the UE may transmit the repetitions of the uplink channel transmission, where the transmitting includes transmitting a first of the repetitions according to a first sounding reference signal resource of the set of sounding reference signal resources and transmitting a second of the repetitions according to a second sounding reference signal resource of the set of sounding reference signal resources. The operations of 1320 may be performed according to the methods described herein. In some examples, aspects of the operations of 1320 may be performed by an uplink channel transmitter as described with reference to FIGS. 5 through 8.

Figure 14:
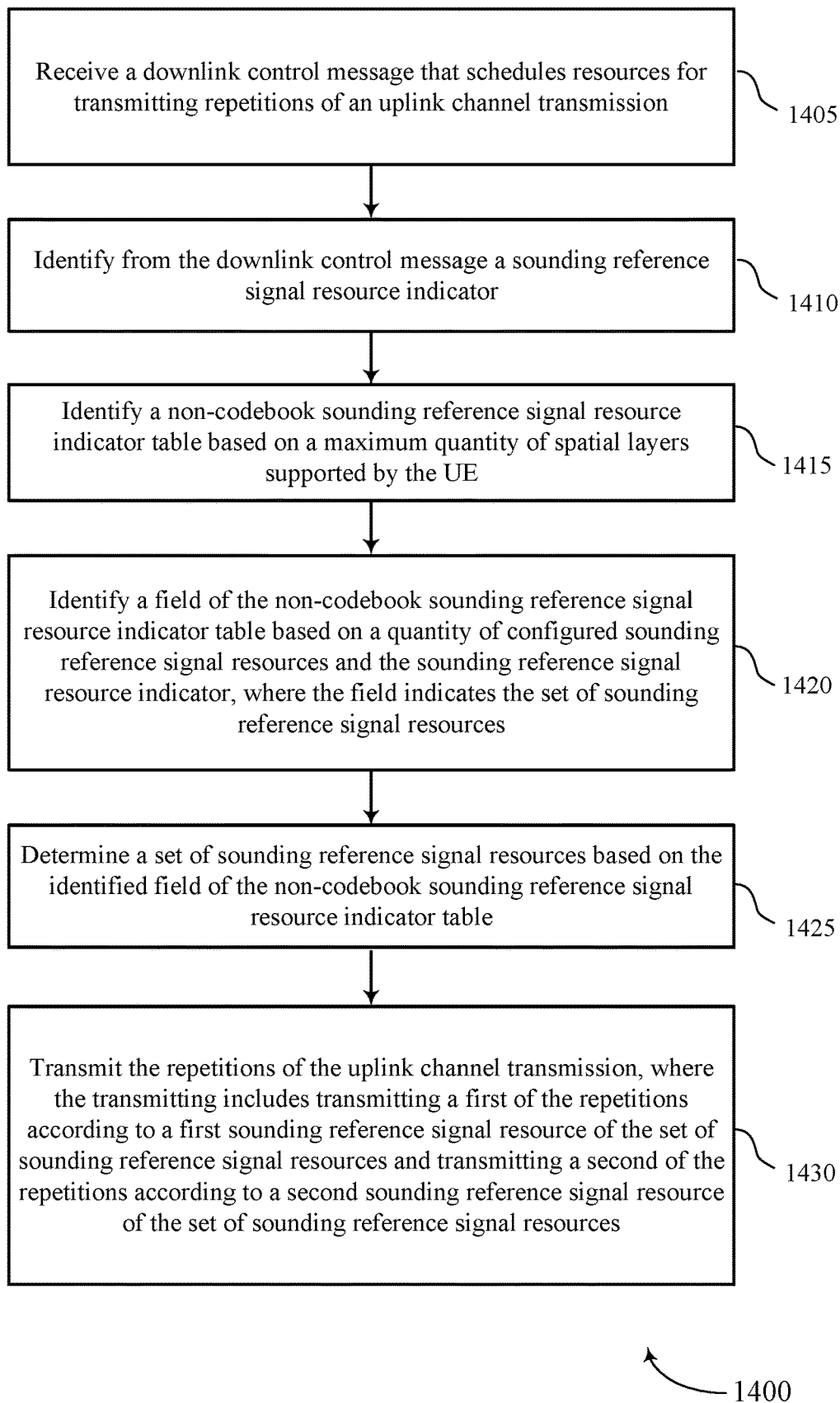

FIG. 14 shows a flowchart illustrating a method 1400 that supports uplink repetition configuration in accordance with aspects of the present disclosure. The operations of method 1400 may be implemented by a UE 115 or its components as described herein. For example, the operations of method 1400 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1405, the UE may receive a downlink control message (e.g., downlink control information, a PDCCH, an uplink grant) that schedules resources for transmitting repetitions of an uplink channel transmission (e.g., PUSCH repetitions). The operations of 1405 may be performed according to the methods described herein. In some examples, aspects of the operations of 1405 may be performed by a downlink control receiver as described with reference to FIGS. 5 through 8.

At 1410, the UE may identify from the downlink control message a sounding reference signal resource indicator (e.g., an SRI field indicating a set of one or more SRIs). The operations of 1410 may be performed according to the methods described herein. In some examples, aspects of the operations of 1410 may be performed by a downlink control interpreter as described with reference to FIGS. 5 through 8.

At 1415, the UE may identify a non-codebook sounding reference signal resource indicator table based on a maximum quantity of spatial layers supported by the UE (e.g., $L_{max}$). The operations of 1415 may be performed according to the methods described herein. In some examples, aspects of the operations of 1415 may be performed by an SRS lookup resource manager as described with reference to FIGS. 5 through 8.

At 1420, the UE may identify a field of the non-codebook sounding reference signal resource indicator table based on a quantity of configured sounding reference signal resources (e.g., $N_{SRS}$) and the sounding reference signal resource indicator, where the field indicates the set of sounding reference signal resources. The operations of 1420 may be performed according to the methods described herein. In some examples, aspects of the operations of 1420 may be performed by an SRS lookup resource manager as described with reference to FIGS. 5 through 8.

At 1425, the UE may determine a set of sounding reference signal resources based on the identified field of the non-codebook sounding reference signal resource indicator table. The operations of 1425 may be performed according to the methods described herein. In some examples, aspects of the operations of 1425 may be performed by an SRS resource manager as described with reference to FIGS. 5 through 8.

At 1430, the UE may transmit the repetitions of the uplink channel transmission, where the transmitting includes transmitting a first of the repetitions according to a first sounding reference signal resource of the set of sounding reference signal resources and transmitting a second of the repetitions according to a second sounding reference signal resource of the set of sounding reference signal resources. The operations of 1430 may be performed according to the methods described herein. In some examples, aspects of the operations of 1430 may be performed by an uplink channel transmitter as described with reference to FIGS. 5 through 8.

Figure 15:
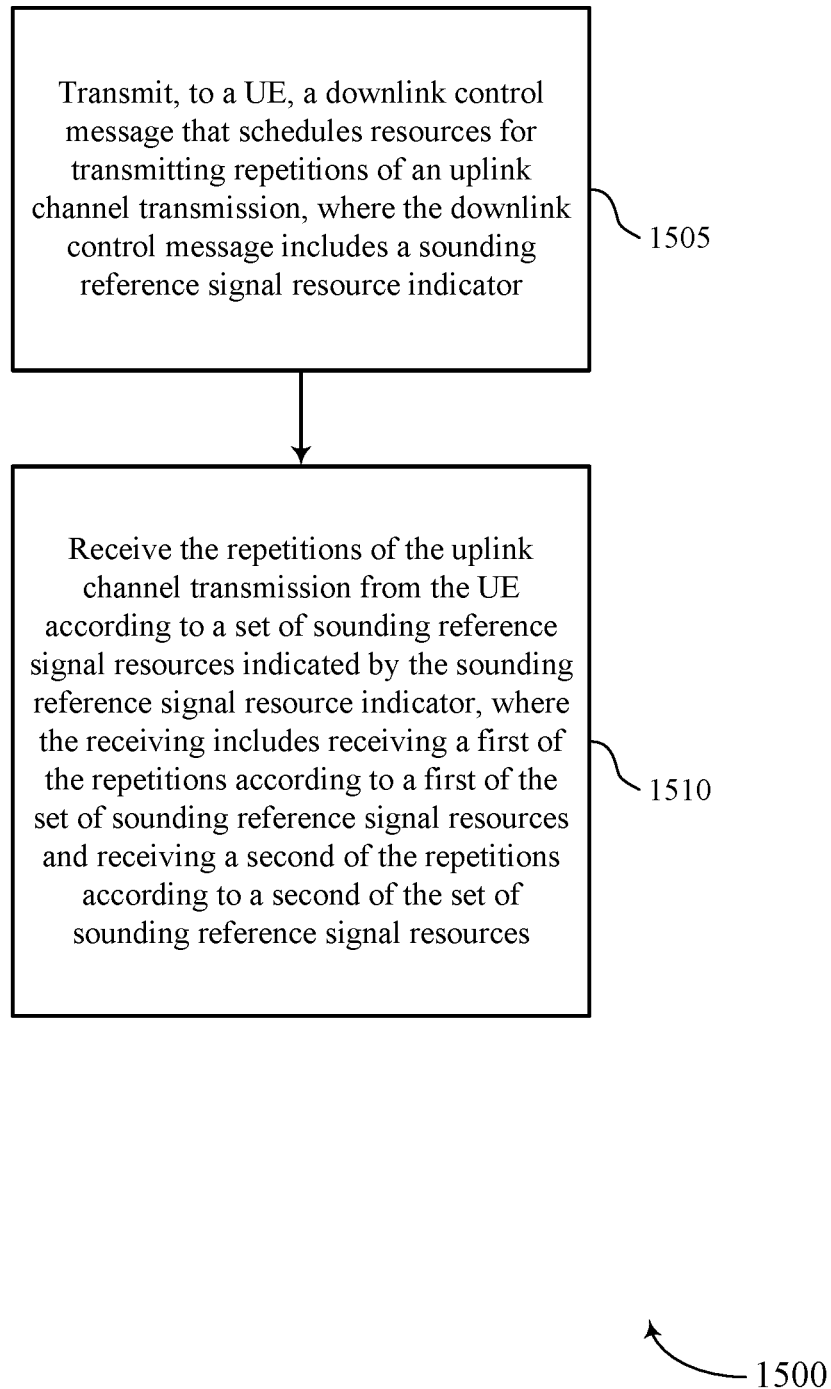

FIG. 15 shows a flowchart illustrating a method 1500 that supports uplink repetition configuration in accordance with aspects of the present disclosure. The operations of method 1500 may be implemented by a base station 105 or its components as described herein. For example, the operations of method 1500 may be performed by a communication manager as described with reference to FIGS. 9 through 12. In some examples, a base station may execute a set of instructions to control the functional elements of the base station to perform the described functions. Additionally or alternatively, a base station may perform aspects of the described functions using special-purpose hardware.

At 1505, the base station may transmit, to a UE, a downlink control message (e.g., downlink control information, a PDCCH) that schedules resources for transmitting repetitions of an uplink channel transmission, where the downlink control message includes a sounding reference signal resource indicator (e.g., an SRI). The operations of 1505 may be performed according to the methods described herein. In some examples, aspects of the operations of 1505 may be performed by a downlink control transmitter as described with reference to FIGS. 9 through 12.

At 1510, the base station may receive the repetitions of the uplink channel transmission from the UE according to a set of sounding reference signal resources indicated by the sounding reference signal resource indicator, where the receiving includes receiving a first of the repetitions according to a first of the set of sounding reference signal resources and receiving a second of the repetitions according to a second of the set of sounding reference signal resources. The operations of 1510 may be performed according to the methods described herein. In some examples, aspects of the operations of 1510 may be performed by an uplink transmission receiver as described with reference to FIGS. 9 through 12.

Figure 16:
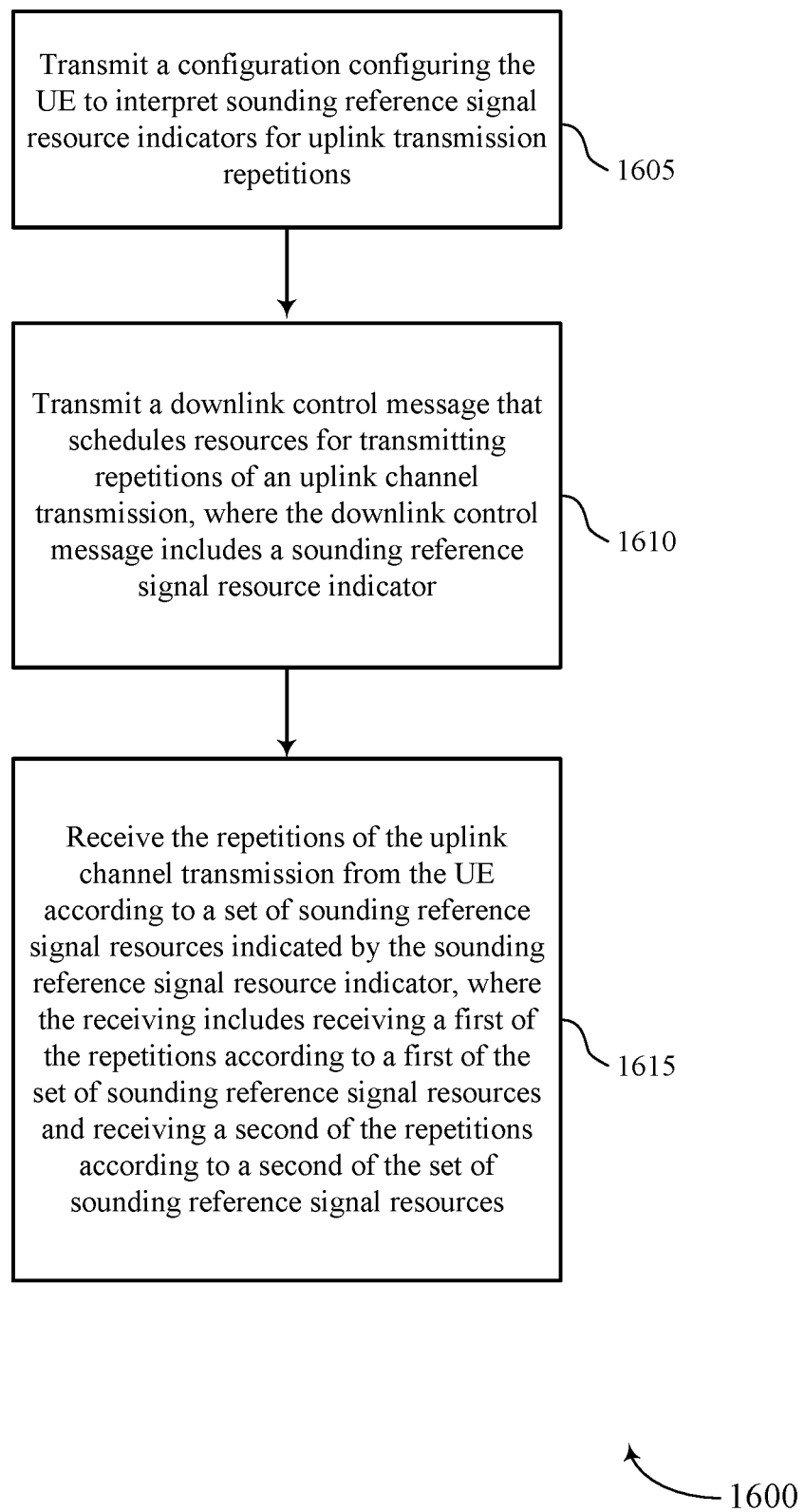

FIG. 16 shows a flowchart illustrating a method 1600 that supports uplink repetition configuration in accordance with aspects of the present disclosure. The operations of method 1600 may be implemented by a base station 105 or its components as described herein. For example, the operations of method 1600 may be performed by a communication manager as described with reference to FIGS. 9 through 12. In some examples, a base station may execute a set of instructions to control the functional elements of the base station to perform the described functions. Additionally or alternatively, a base station may perform aspects of the described functions using special-purpose hardware.

At 1605, the base station may transmit a configuration (e.g., an RRC configuration, a DCI indication separate from a downlink control message scheduling resources) configuring the UE to interpret sounding reference signal resource indicators for uplink transmission repetitions (e.g., configuring the UE to interpret an SRI field as indicating SRS resources to be mapped to different PUSCH repetitions in the time domain, rather than interpreting an SRI field as indicating SRS resources that are to be combined for a single MIMO transmission in the time domain). The operations of 1605 may be performed according to the methods described herein. In some examples, aspects of the operations of 1605 may be performed by a SRI configuration manager as described with reference to FIGS. 9 through 12.

At 1610, the base station may transmit, to a UE, a downlink control message (e.g., downlink control information, a PDCCH, an uplink grant) that schedules resources for transmitting repetitions of an uplink channel transmission, where the downlink control message includes a sounding reference signal resource indicator (e.g., an SRI). The operations of 1610 may be performed according to the methods described herein. In some examples, aspects of the operations of 1610 may be performed by a downlink control transmitter as described with reference to FIGS. 9 through 12.

At 1615, the base station may receive the repetitions of the uplink channel transmission from the UE according to a set of sounding reference signal resources indicated by the sounding reference signal resource indicator and the transmitted configuration, where the receiving includes receiving a first of the repetitions according to a first of the set of sounding reference signal resources and receiving a second of the repetitions according to a second of the set of sounding reference signal resources. The operations of 1615 may be performed according to the methods described herein. In some examples, aspects of the operations of 1615 may be performed by an uplink transmission receiver as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), the method comprising:
receiving a downlink control message that schedules resources for transmitting repetitions of an uplink channel transmission;
identifying from the downlink control message a sounding reference signal resource indicator;
determining a plurality of sounding reference signal resources based at least in part on the sounding reference signal resource indicator;
transmitting the repetitions of the uplink channel transmission, wherein the transmitting comprises transmitting a first of the repetitions according to a first sounding reference signal resource of the plurality of sounding reference signal resources and transmitting a second of the repetitions according to a second sounding reference signal resource of the plurality of sounding reference signal resources;
receiving an indication of a repetition factor, the repetition factor corresponding to a quantity of repetitions of the uplink channel transmission;
interpreting the repetition factor to indicate a total quantity of repetitions of the uplink channel transmission;
identifying that the repetition factor exceeds a quantity of sounding reference signal resources in the determined plurality of sounding reference signal resources; and
transmitting at least two of the repetitions of the uplink channel transmission with a same one of the plurality of sounding reference signal resources.

2. The method of claim 1, wherein each of the plurality of sounding reference signal resources corresponds to a respective spatial resource.

3. The method of claim 2, wherein the spatial resource corresponds to a beam, a precoder, a panel, or a combination thereof.

4. The method of claim 1, further comprising:
receiving a configuration configuring the UE to interpret sounding reference signal resource indicators for uplink transmission repetitions.

5. The method of claim 1, wherein determining the plurality of sounding reference signal resources comprises:
identifying a non-codebook sounding reference signal resource indicator table based at least in part on a maximum quantity of spatial layers supported by the UE; and
identifying a field of the non-codebook sounding reference signal resource indicator table based at least in part on a quantity of configured sounding reference signal resources and the sounding reference signal resource indicator, wherein the field indicates the plurality of sounding reference signal resources.

6. The method of claim 1, further comprising:
interpreting the repetition factor to indicate a respective quantity of repetitions of the uplink channel transmission for different ones of the plurality of sounding reference signal resources.

7. The method of claim 1, further comprising:
mapping each of the plurality of sounding reference signal resources to a respective one of the repetitions of the uplink channel transmission in a first sub-sequence of the repetitions of the uplink channel transmission; and
mapping at least one of the plurality of sounding reference signal resources to a respective one of the repetitions of the uplink channel transmission in a second sub-sequence of the repetitions of the uplink channel transmission.

8. The method of claim 1, further comprising:
mapping a first of the plurality of sounding reference signal resources to at least two of the repetitions of the uplink channel transmission in a first sub-sequence of the repetitions of the uplink channel transmission; and
mapping a second of the plurality of sounding reference signal resources to at least two of the repetitions of the uplink channel transmission in a second sub-sequence of the repetitions of the uplink channel transmission.

9. The method of claim 1, further comprising:
receiving control signaling indicating a configuration for mapping sounding reference signal resources to the repetitions of the uplink channel transmission.

10. The method of claim 1, further comprising:
identifying that one of the repetitions of the uplink channel transmission overlaps a transmission boundary in a time domain;
mapping a portion of the one of the repetitions of the uplink channel transmission that precedes the transmission boundary to a first of the plurality of sounding reference signal resources; and
mapping a portion of the one of the repetitions of the uplink channel transmission that follows the transmission boundary to a second of the plurality of sounding reference signal resources.

11. The method of claim 10, wherein the first of the plurality of sounding reference signal resources is different from the second of the plurality of sounding reference signal resources.

12. The method of claim 10, wherein the first of the plurality of sounding reference signal resources is the same as the second of the plurality of sounding reference signal resources.

13. The method of claim 1, further comprising:
identifying from the downlink control message a second sounding reference signal resource indicator;
determining a second plurality of sounding reference signal resources based at least in part on the sounding reference signal resource indicator;
mapping the first of the repetitions to at least two of the plurality of sounding reference signal resources;
mapping the second of the repetitions to at least two of the plurality of sounding reference signal resources; and
mapping a third of the repetitions to at least two of the second plurality of sounding reference signal resources.

14. The method of claim 13, wherein:
transmitting the first of the repetitions comprises transmitting over a first plurality of spatial layers and transmitting the third of the repetitions comprises transmitting over a second plurality of spatial layers.

15. The method of claim 1, further comprising:
identifying from the downlink control message a redundancy version indicator; and
mapping the repetitions of the uplink channel transmission to the plurality of sounding reference signal resources based at least in part on jointly decoding the sounding reference signal resource indicator and the redundancy version indicator.

16. The method of claim 1, further comprising:
mapping a first transmit precoding matrix to a first of the plurality of sounding reference signal resources; and
mapping a second transmit precoding matrix to a second of the plurality of sounding reference signal resources.

17. The method of claim 1, further comprising:
mapping each of the repetitions of the uplink channel transmission to different resources in a time domain.

18. The method of claim 1, further comprising:
mapping each of the repetitions of the uplink channel transmission to the same resources in a frequency domain.

19. The method of claim 1, wherein the uplink channel transmission comprises a single transport block.

20. The method of claim 1, wherein determining the plurality of sounding reference signal resources is based at least in part on the UE being configured for non-codebook-based uplink communication.

21. The method of claim 1, wherein determining the plurality of sounding reference signal resources is based at least in part on the UE being configured for codebook-based uplink communication.

22. The method of claim 1, wherein the transmission of each of the repetitions of the uplink channel transmission corresponds to a single spatial layer transmission.

23. An apparatus for wireless communications at a user equipment (UE), comprising:
a processor,
memory in electronic communication with the processor, and
instructions stored in the memory and executable by the processor to cause the apparatus to:
receive a downlink control message that schedules resources for transmitting repetitions of an uplink channel transmission;
identify from the downlink control message a sounding reference signal resource indicator;
determine a plurality of sounding reference signal resources based at least in part on the sounding reference signal resource indicator;
transmit the repetitions of the uplink channel transmission, wherein the transmitting comprises transmitting a first of the repetitions according to a first sounding reference signal resource of the plurality of sounding reference signal resources and transmitting a second of the repetitions according to a second sounding reference signal resource of the plurality of sounding reference signal resources;
receive an indication of a repetition factor, the repetition factor corresponding to a quantity of repetitions of the uplink channel transmission;
interpret the repetition factor to indicate a total quantity of repetitions of the uplink channel transmission;
identify that the repetition factor exceeds a quantity of sounding reference signal resources in the determined plurality of sounding reference signal resources; and
transmit at least two of the repetitions of the uplink channel transmission with a same one of the plurality of sounding reference signal resources.

24. An apparatus for wireless communications at a user equipment (UE), comprising:
means for receiving a downlink control message that schedules resources for transmitting repetitions of an uplink channel transmission;
means for identifying from the downlink control message a sounding reference signal resource indicator;
means for determining a plurality of sounding reference signal resources based at least in part on the sounding reference signal resource indicator;
means for transmitting the repetitions of the uplink channel transmission, wherein the transmitting comprises transmitting a first of the repetitions according to a first sounding reference signal resource of the plurality of sounding reference signal resources and transmitting a second of the repetitions according to a second sounding reference signal resource of the plurality of sounding reference signal resources,
means for receiving an indication of a repetition factor, the repetition factor corresponding to a quantity of repetitions of the uplink channel transmission;
means for interpreting the repetition factor to indicate a total quantity of repetitions of the uplink channel transmission;
means for identifying that the repetition factor exceeds a quantity of sounding reference signal resources in the determined plurality of sounding reference signal resources; and
means for transmitting at least two of the repetitions of the uplink channel transmission with a same one of the plurality of sounding reference signal resources.

25. A method for wireless communications at a user equipment (UE), the method comprising:
receiving a downlink control message that schedules resources for transmitting repetitions of an uplink channel transmission;
identifying from the downlink control message a sounding reference signal resource indicator;
determining a plurality of sounding reference signal resources based at least in part on the sounding reference signal resource indicator;
transmitting the repetitions of the uplink channel transmission, wherein the transmitting comprises transmitting a first of the repetitions according to a first sounding reference signal resource of the plurality of sounding reference signal resources and transmitting a second of the repetitions according to a second sounding reference signal resource of the plurality of sounding reference signal resources; and
wherein the sounding reference signal resource indicator corresponds to a single bit, the method further comprising:
receiving a configuration for mapping single-bit sounding reference signal resource indicators to sounding reference signal resources indicated by two-bit sounding reference signal resource indicators,
wherein determining the plurality of sounding reference signal resources is based at least in part on the sounding reference signal resource indicator and the received configuration.

26. The method of claim 25, wherein the configuration is based at least in part on the UE being configured for codebook-based uplink communication.

27. An apparatus for wireless communications at a user equipment (UE), comprising:
a processor,
memory in electronic communication with the processor, and instructions stored in the memory and executable by the processor to cause the apparatus to:
receive a downlink control message that schedules resources for transmitting repetitions of an uplink channel transmission;
identify from the downlink control message a sounding reference signal resource indicator;
determine a plurality of sounding reference signal resources based at least in part on the sounding reference signal resource indicator; and
transmit the repetitions of the uplink channel transmission, wherein the transmitting comprises transmitting a first of the repetitions according to a first sounding reference signal resource of the plurality of sounding reference signal resources and transmitting a second of the repetitions according to a second sounding reference signal resource of the plurality of sounding reference signal resources;
wherein the sounding reference signal resource indicator corresponds to a single bit, the method further comprising:
receiving a configuration for mapping single-bit sounding reference signal resource indicators to sounding reference signal resources indicated by two-bit sounding reference signal resource indicators,
wherein determining the plurality of sounding reference signal resources is based at least in part on the sounding reference signal resource indicator and the received configuration.

28. A method for wireless communications at a user equipment (UE), the method comprising:
receiving a downlink control message that schedules resources for transmitting repetitions of an uplink channel transmission;
identifying from the downlink control message a sounding reference signal resource indicator;
determining a plurality of sounding reference signal resources based at least in part on the sounding reference signal resource indicator;
transmitting the repetitions of the uplink channel transmission, wherein the transmitting comprises transmitting a first of the repetitions according to a first sounding reference signal resource of the plurality of sounding reference signal resources and transmitting a second of the repetitions according to a second sounding reference signal resource of the plurality of sounding reference signal resources; and
wherein the UE is configured for codebook-based uplink communication and the sounding reference signal resource indicator comprises a two bit indication.

* * * * *